US012159345B2

(12) United States Patent
Fialko

(10) Patent No.: US 12,159,345 B2
(45) Date of Patent: Dec. 3, 2024

(54) THREE-DIMENSIONAL MODELLING FROM PHOTOGRAPHS IN SERIES

(71) Applicant: Kevin D. Fialko, La Jolla, CA (US)

(72) Inventor: Kevin D. Fialko, La Jolla, CA (US)

( * ) Notice: Subject to any disclaimer, the term of this patent is extended or adjusted under 35 U.S.C. 154(b) by 0 days.

(21) Appl. No.: 17/587,254

(22) Filed: Jan. 28, 2022

(65) Prior Publication Data

US 2022/0245890 A1    Aug. 4, 2022

Related U.S. Application Data

(60) Provisional application No. 63/143,506, filed on Jan. 29, 2021.

(51) Int. Cl.
| | | |
|---|---|---|
| *G06T 17/00* | (2006.01) | |
| *G06T 7/38* | (2017.01) | |
| *G06T 7/80* | (2017.01) | |

(52) U.S. Cl.
CPC ............. *G06T 17/00* (2013.01); *G06T 7/38* (2017.01); *G06T 7/80* (2017.01); *G06T 2207/20221* (2013.01)

(58) Field of Classification Search
None
See application file for complete search history.

(56) References Cited

U.S. PATENT DOCUMENTS

| | | | |
|---|---|---|---|
| 9,983,464 B1* | 5/2018 | Kim | F16M 11/10 |
| 10,311,282 B2 | 6/2019 | Shotton et al. | |
| 2002/0114536 A1* | 8/2002 | Xiong | G06V 10/24 382/284 |
| 2016/0156829 A1* | 6/2016 | Takamori | H04N 5/272 348/207.1 |
| 2016/0295193 A1* | 10/2016 | Van Nieuwenhove | H04N 13/128 |
| 2019/0122384 A1* | 4/2019 | Ertle | G06V 10/44 |

OTHER PUBLICATIONS

Ahmadabadian et al.; "An automatic 3D reconstruction system for texture-less objects;" Apr. 3, 2019; Robotics and Autonomous Systems, vol. 117, pp. 29-39 (Year: 2019).*

M. Alomran and D. Chai, "Feature-based panoramic image stitching," 2016 14th International Conference on Control, Automation, Robotics and Vision (ICARCV), Phuket, Thailand, 2016, pp. 1-6 (Year: 2016).*

Matthew Brown, David G. Lowe; 'Automatic Panoramic Image Stitching using Invariant Features'; Department of Computer Science, University of British Columbia, Vancouver, Canada.

* cited by examiner

*Primary Examiner* — Peter Hoang
(74) *Attorney, Agent, or Firm* — JCIP; Joseph G. Chu

(57) ABSTRACT

Modeling a product, including taking a first picture of a product at a first position and at a first distance with a camera, taking a second picture of a product at the first distance and a second position with the camera, combining the pictures based on overlapping portions of the respective pictures, and generating an interactable model of the combined pictures.

18 Claims, 16 Drawing Sheets

THREE-DIMENSIONAL MODELLING FROM PHOTOGRAPHS IN SERIES

CROSS-REFERENCE TO RELATED APPLICATION

This application claims priority, and claims the benefit of, U.S. Provisional Patent Application No. 63/143,506 filed on Jan. 29, 2021, the content of which is hereby incorporated herein by its entirety.

BACKGROUND OF THE INVENTION

Field of the Invention

This invention relates to three-dimensional modelling and display. More particularly, the invention is directed to creating a three-dimensional model of a product and providing the model via a product webpage for manipulation by a potential purchaser.

Prior Art

U.S. Pat. No. 10,311,282 describes one embodiment of an existing time-of-flight camera, such as may be used in relation to some embodiments of the systems and methods in accordance with the principles of the present invention.

DESCRIPTION OF THE RELATED ART

A wireframe model may be a visual representation of a three-dimensional (3D) physical object used in three-dimensional computer graphics. Such a wireframe may be created by specifying each edge of the physical object where two mathematically continuous smooth surfaces meet, or by connecting an object's constituent vertices using straight lines and/or curves. The object can be projected into screen space and rendered by drawing lines at the location of each edge. The term "wire frame" comes from designers using metal wire to represent the three-dimensional shape of solid objects. Three-dimensional wire frame computer models allow for the construction and manipulation of solids and solid surfaces. Three-dimensional solid modeling efficiently draws higher quality representations of solids than conventional line drawing.

Using a wire-frame model allows for the visualization of the underlying design structure of a three-dimensional model. Traditional two-dimensional views and drawings/renderings can be created by the appropriate rotation of the object, and the selection of hidden line removal via cutting planes.

Since wire-frame renderings are relatively simple and fast to calculate, they are often used in cases where a relatively high screen frame rate is needed (for instance, when working with a particularly complex three-dimensional model, or in real-time systems that model exterior phenomena). When greater graphical detail is desired, surface textures can be added automatically after the completion of the initial rendering of the wire frame. This may allow a designer to quickly review solids, or rotate objects to different views without the long delays associated with more realistic rendering, or even the processing of faces and simple flat shading.

The wire frame format may be well-suited and widely used in programming tool paths for direct numerical control (DNC) machine tools.

Hand-drawn wire-frame-like illustrations date back as far as the Italian Renaissance. Wire-frame models were also used extensively in video games to represent three-dimensional objects during the 1980s and early 1990s, when "properly" filled three-dimensional objects would have been too complex to calculate and draw with the computers of the time. Wire-frame models are also used as the input for computer-aided manufacturing (CAM).

There are three main types of three-dimensional computer-aided design (CAD) models; wire frame is the most abstract and least realistic. The other types are surface and solid. The wire-frame method of modelling consists of only lines and curves that connect the points or vertices and thereby define the edges of an object.

Wireframing is one of the methods used in geometric modelling systems. A wireframe model represents the shape of a solid object with its characteristic lines and points. There are two types of wireframe modelling: Pro's and Con's. In Pro's user gives a simple input to create a shape. It is useful in developing systems. While in Con's wireframe model, it does not include information about inside and outside boundary surfaces. Today, wireframe models are used to define complex solid objects. The designer makes a wireframe model of a solid object, and then the CAD operator reconstructs the object, including detailed analysis. This technique has some advantages: generally the three-dimensional solid objects are complex, but wireframe models can be viewed in one dimension, improving comprehensibility; the solid object can be modified further; the designer can ignore the geometry inside a surface while in solid modelling the designer has to give consistent geometry for all details; wireframe models may require less memory space and CPU capacity.

Wireframe models may be specified by a vertex table and/or an edge table. In some complex models, three-dimensional surfaces may be represented by a plethora of small triangles. However, a single color is typically accorded each surface, which may detract from realism of the rendered object.

SUMMARY

Embodiments of the present invention add a new method of 3d modelling and 3d simulation of an object through photo stitching pictures taken around an object.

Embodiments of the present invention include modeling a product, including taking a first picture of a product at a first position and at a first distance with a camera, taking a second picture of a product at the first distance and a second position with the camera, combining the pictures based on overlapping portions of the respective pictures, and generating an interactable model of the combined pictures.

Further embodiments of the present invention include systems including a product within a lightbox, a camera within the lightbox, the camera configured to orbit about the product, and a processor configured to combine two or more pictures taken by the camera.

DETAILED DESCRIPTION OF THE PREFERRED EMBODIMENTS

Figure 1:
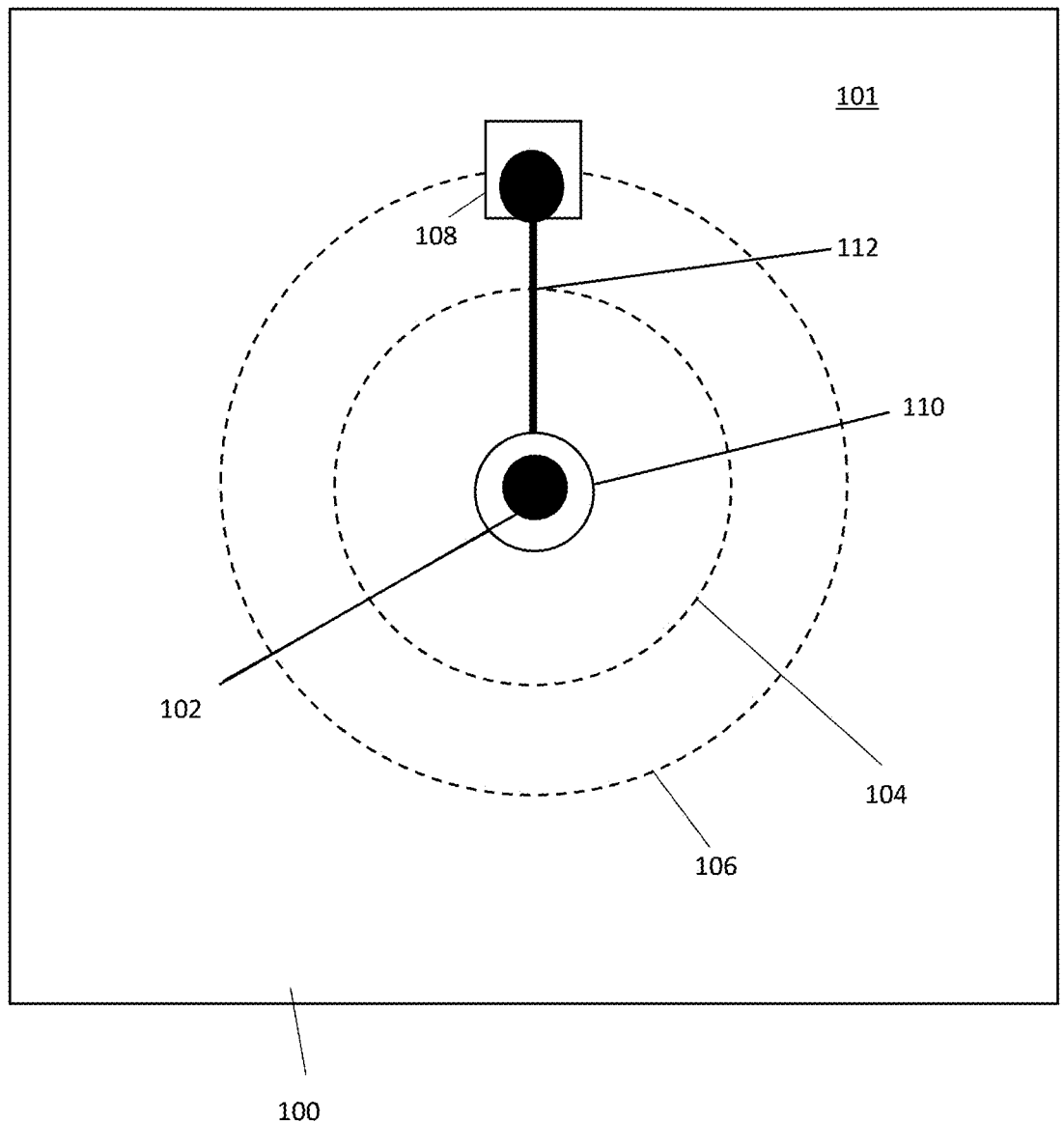
FIG. 1 illustrates a schematic block diagram of a system for obtaining a series of photographs of a product for three-dimensional modelling through photo stitching in accordance with the principles of the present invention.

The following description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." Similarly, references to an element in the singular in the description mean "one or more" unless specifically stated otherwise. All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

With respect to the present application, "about" or "approximately" means within plus or minus one at the last reported digit. For example, about 1.00 means 1.00±0.01 unit.

With respect to the present application, "around" used in conjunction with a numeral measurement means within plus or minus one unit. For example, around 50% means 49%-51%. For example, around 11.01 units means 10.01-12.01.

With respect to the present description "and" and "or" shall be construed as conjunctively or disjunctively, whichever provides the broadest disclosure in each instance of the use of "and" or "or."

Many product webpages display separate views of a corresponding product by presentation of individual pictures from disconnected views in a viewport, or alternatively, by display of a video. However, several discrete views and adjustable depth are absent from these pictures, depriving customers and potential purchasers of a three-dimensional tactile experience with the product via virtual means. Product webpages could include a three-dimensional model of the product, but present models include CAD microframe renderings that colorize small wireframe surface model triangles. These models result in lower quality surface rendering than provided by embodiments of the present invention. Therefore, embodiments of the present invention include photographic images placed for surface rendering to result in a three-dimensional photographic quality model. In some embodiments, pictures may simply be overlayed, and the views cycled to imitate three-dimensional turning of the product. Furthermore, embodiments of the present invention include surface topography storage and/or a corresponding wireframe model calculation from time of flight calculations by a camera.

By way of example, the present invention may be embodied on a webpage displaying a product, such as in or near a picture viewport displaying the product. Furthermore, embodiments include controls for manipulation of the product model, such as click-and-drag.

Embodiments of the present invention include providing up to a full 360-degree view of an exterior of a product at one or more zoom levels, up to a 360-degree view of an interior of the product from one or more positions (e.g. the interior of a car from the front seat and/or the passenger seat), and up to fully spherical rotation about the product plus zoom to various zoom orbit levels and/or interpolation to intermediate zoom positions. Furthermore, parts of the product may be zoomed and rotated about, such as a bumper, a wheel, etc. In addition, exploded views of parts may be displayed upon selection of the part and orbit about the part. In some embodiments, 64,442 degrees of varying positions about a viewing sphere may be selected for view of the product. In further embodiments, multiple zoom orbits may represent 64,442 degrees of viewing points in each of several zoom orbits.

Embodiments of the present inventions may be embodied in a method comprising steps, as a computer program product embodied as executable instructions on a processor, as a system comprising a computer, a server, a network of a computer and a server, and/or a distributed network of computers and/or servers.

Thus, the following description will be understood by one of ordinary skill in the art as explaining the steps to 1) obtain the pictures of the product, 2) process the raw pictures of the product, and 3) provide the up to 360-degree rotatable, spherically rotatable, and zoomable interactable product view to an end user. Embodiments of the present invention may contain one, multiple, or all of these steps to enhance the presentation of the product to an end user viewing the product for purchase via web browser, app, or another computer program viewed through a screen.

Image stitching or photo stitching is the process of combining multiple photographic images with overlapping fields of view to produce a segmented panorama, high-resolution image, or as in embodiments of the present invention, a three-dimensional globe model. Image stitching and photo stitching may be similar to photogrammetry. Performed through the use of computer software, most approaches to image stitching may require nearly exact overlaps between images and identical exposures to produce seamless results, although some stitching algorithms may use differently exposed images for high-dynamic-range imaging in regions of overlap. Some digital cameras may perform such stitch of photos internally. In some embodiments, Autodesk ReCap, Agisoft Metashape, AliceVision Meshroom, 3DF Zephyr, Colmap, Regard3D, Visual SFM, iWitness, Photomodeler, Qlone, PTGui, RealityCapture, or Agisoft PhotoScan may be used on a processor to perform photo stitching. Furthermore, these applications may be used for image and model correction, such as color balance, photogrammetry distance calculations, angle correction, and/r seam correction.

The image stitching process may be divided into three main components: image registration, calibration, and blending.

Image Stitching Algorithms

In order to estimate image alignment, algorithms are needed to determine the appropriate mathematical model relating pixel coordinates in one image to pixel coordinates in another. Algorithms that combine direct pixel-to-pixel comparisons with gradient descent (and other optimization techniques) can be used to estimate these parameters.

Distinctive features can be found in each image and then efficiently matched to rapidly establish correspondences between pairs of images. When multiple images exist in a panorama, techniques have been developed to compute a globally consistent set of alignments and to efficiently discover which images overlap one another.

A final compositing surface onto which to warp or projectively transform and place all of the aligned images is needed, as are algorithms to seamlessly blend the overlapping images, even in the presence of parallax, lens distortion, scene motion, and exposure differences.

Image Stitching Issues

Because the illumination in two views cannot be guaranteed to be identical, stitching two images could create a visible seam. Therefore, the object that is the subject of the photographs in embodiments of the present invention may be placed in a lightbox for consistent lighting and exposure throughout the series of photographs. Other reasons for seams could be the background changing between two images for the same continuous foreground. Other major issues to deal with are the presence of parallax, lens distortion, scene motion, and exposure differences. In a non-ideal real-life case, the intensity varies across the whole scene, and so does the contrast and intensity across frames. Additionally, the aspect ratio of a panorama image needs to be taken into account to create a visually pleasing composite.

For photo stitching, the ideal set of images will have a reasonable amount of overlap (at least 15-30%) to overcome lens distortion and have enough detectable features. However, embodiments of the present invention include 80% overlap or greater. Further embodiments include 90% overlap or greater. The set of images may have consistent exposure between frames to minimize the probability of seams occurring.

Keypoint Detection

Feature detection may automatically find correspondences between images. Robust correspondences may help estimate the necessary transformation to align an image with the image it is being composited on. Corners, blobs, Harris corners, and differences of Gaussians of Harris corners may be good keypoint features since they are repeatable and distinct. In some embodiments of the present invention, 40,000 to 50,000 key points may be identified and/or matched to verify overlap. Two matching keypoints between corresponding pictures may be referred to as a tie point. Tie points may be overlaid to align corresponding neighboring pictures. In embodiments of the present invention, neighboring pictures may be taken such that about 80% or greater overlap between the pictures occurs. This may ensure sufficient overlap for identification of multiple tie points between the corresponding pictures. The pictures may be combined based on tie points to generate a product model and/or neighboring pictures appended to the product model. In some embodiments, about 4,000 tie points may be used. Non-overlapping portions of the picture may be added to the product model. In some embodiments, a non-overlapping portion of one pair of pictures may be verified by matching with a different neighboring picture.

One of the first operators for interest point detection was developed by Hans P. Moravec in 1977 for his research involving the automatic navigation of a robot through a clustered environment. Moravec also defined the concept of "points of interest" in an image and concluded these interest points could be used to find matching regions in different images. The Moravec operator is considered to be a corner detector because it defines interest points as points where there are large intensity variations in all directions. This often is the case at corners.

Harris and Stephens improved upon Moravec's corner detector by considering the differential of the corner score with respect to direction directly. They needed it as a processing step to build interpretations of a robot's environment based on image sequences. Like Moravec, they needed a method to match corresponding points in consecutive image frames but were interested in tracking both corners and edges between frames.

Scale Invariant Feature Transform (SIFT) and SURF may be included as key-point or interest point detector algorithms. Once a feature has been detected, a descriptor method like SIFT descriptor can be applied to later match them.

Registration

Image registration involves matching features in a set of images or using direct alignment methods to search for image alignments that minimize the sum of absolute differences between overlapping pixels. When using direct alignment methods one might first calibrate one's images to get better results. Additionally, users may input a rough model of the panorama to help the feature matching stage, so that e.g., only neighboring images are searched for matching features. Since there are smaller group of features for matching, the result of the search is more accurate, and execution of the comparison is faster.

To estimate a robust model from the data, a common method used is known as RANSAC. The name RANSAC is an abbreviation for "RANdom SAmple Consensus". It is an iterative method for robust parameter estimation to fit mathematical models from sets of observed data points which may contain outliers. The algorithm is non-deterministic in the sense that it produces a reasonable result only with a certain probability, with this probability increasing as more iterations are performed. It being a probabilistic method means that different results will be obtained for every time the algorithm is run.

The RANSAC algorithm has found many applications in computer vision, including the simultaneous solving of the correspondence problem and the estimation of the fundamental matrix related to a pair of stereo cameras. The basic assumption of the method is that the data consists of "inliers", i.e., data whose distribution can be explained by some mathematical model, and "outliers" which are data that do not fit the model. Outliers are considered points which come from noise, erroneous measurements, or simply incorrect data.

For the problem of homography estimation, RANSAC works by trying to fit several models using some of the point pairs and then checking if the models were able to relate most of the points. The best model—the homography, which produces the highest number of correct matches—is then chosen as the answer for the problem; thus, if the ratio of number of outliers to data points is very low, the RANSAC outputs a decent model fitting the data.

Calibration

Image calibration aims to minimize differences between an ideal lens models and the camera-lens combination that was used, optical defects such as distortions, exposure differences between images, vignetting, camera response and chromatic aberrations. If feature detection methods were used to register images and absolute positions of the features were recorded and saved, stitching software may use the data for geometric optimization of the images in addition to placing the images on the panosphere. Panotools and its various derivative programs use this method.

Alignment

Alignment may be necessary to transform an image to match the viewpoint of the image it is being composited with. Alignment, in simple terms, is a change in the coordinates system so that it adopts a new coordinate system which outputs image matching the required viewpoint. The types of transformations an image may go through are pure translation, pure rotation, a similarity transform which includes translation, rotation and scaling of the image which needs to be transformed, Affine or projective transform.

Projective transformation is the farthest an image can transform (in the set of two-dimensional planar transformations), where only visible features that are preserved in the transformed image are straight lines whereas parallelism is maintained in an affine transform.

Projective transformation can be mathematically described as $$x' = H \cdot x, \quad \text{a)}$$

where x is points in the old coordinate system, x' is the corresponding points in the transformed image and H is the homography matrix.

Expressing the points x and x' using the camera intrinsics (K and K') and its rotation and translation [R t] to the real-world coordinates X and X', provides $$x = K \cdot [Rt] \cdot X \text{ and } x' = K' \cdot [R't'] \cdot X'. \quad \text{a)}$$

Using the above two equations and the homography relation between x' and x, provides:

$$H = K' \cdot R' \cdot R - 1 \cdot K - 1 \quad \text{a)}$$

The homography matrix H has 8 parameters or degrees of freedom. The homography can be computed using Direct Linear Transform and Singular value decomposition with $$A \cdot h = 0, \quad \text{a)}$$

where A is the matrix constructed using the coordinates of correspondences and h is the one-dimensional vector of the 9 elements of the reshaped homography matrix. To get to h, apply SVD: A=U·S·V T And h=V (column corresponding to the smallest singular vector). This is true since h lies in the null space of A. Since we have 8 degrees of freedom the algorithm requires at least four-point correspondences. In case when RANSAC is used to estimate the homography and multiple correspondences are available the correct homography matrix is the one with the maximum number of inliers.

Compositing

Compositing is the process where the rectified images are aligned in such a way that they appear as a single shot of a scene. Compositing can be automatically done since the algorithm now knows which correspondences overlap.

Blending

Image blending involves executing the adjustments figured out in the calibration stage, combined with remapping of the images to an output projection. Colors are adjusted between images to compensate for exposure differences. If applicable, high dynamic range merging is done along with motion compensation and de-ghosting. Images are blended together, and seam line adjustment is done to minimize the visibility of seams between images.

The seam can be reduced by a simple gain adjustment. This compensation is basically minimizing intensity difference of overlapping pixels. Image blending algorithm allots more weight to pixels near the center of the image. Gain compensated and multi band blended images compare the best. IJCV 2007. Straightening is another method to rectify the image. Matthew Brown and David G. Lowe in their paper 'Automatic Panoramic Image Stitching using Invariant Features' describe methods of straightening which apply a global rotation such that vector u is vertical (in the rendering frame) which effectively removes the wavy effect from output panoramas.

Even after gain compensation, some image edges are still visible due to a number of unmodelled effects, such as vignetting (intensity decreases towards the edge of the image), parallax effects due to unwanted motion of the optical center, mis-registration errors due to mismodelling of the camera, radial distortion and so on. Due to these reasons, they propose a blending strategy called multi band blending.

Projective Layouts

For image segments that have been taken from the same point in space, stitched images can be arranged using one of various map projections.

Rectilinear

Rectilinear projection, where the stitched image is viewed on a two-dimensional plane intersecting the panosphere in a single point. Lines that are straight in reality are shown as straight regardless of their directions on the image. Wide views—around 120° or so—may start to exhibit severe distortion near the image borders. One case of rectilinear projection is the use of cube faces with cubic mapping for panorama viewing. Panorama is mapped to six squares, each cube face showing 90 by 90-degree area of the panorama.

Cylindrical

Cylindrical projection, where the stitched image shows a 360° horizontal field of view and a limited vertical field of view. Panoramas in this projection are meant to be viewed as though the image is wrapped into a cylinder and viewed from within. When viewed on a 2D plane, horizontal lines appear curved while vertical lines remain straight. Vertical distortion increases rapidly when nearing the top of the panosphere. There are various other cylindrical formats, such as Mercator and Miller cylindrical which have less distortion near the poles of the panosphere.

Spherical

Spherical projection or equirectangular projection—which is strictly speaking another cylindrical projection—where the stitched image shows a 360° horizontal by 180° vertical field of view i.e., the whole sphere. Panoramas in this projection are meant to be viewed as though the image is wrapped into a sphere and viewed from within. When viewed on a 2D plane, horizontal lines appear curved as in a cylindrical projection, while vertical lines remain vertical.

Pannini

Since a panorama is basically a map of a sphere, various other mapping projections from cartographers can also be used if so desired. Additionally, there are specialized projections which may have more aesthetically pleasing advantages over normal cartography projections such as Hugin's Pannini projection—named after Italian vedutismo painter Giovanni Paolo Pannini—or PTgui's Vedutismo projection. Different projections may be combined in same image for fine tuning the final look of the output image.

Stereographic

Stereographic projection or fisheye projection can be used to form a little planet panorama by pointing the virtual camera straight down and setting the field of view large enough to show the whole ground and some of the areas above it; pointing the virtual camera upwards creates a tunnel effect. Conformality of the stereographic projection may produce more visually pleasing result than equal area fisheye projection as discussed in the stereo-graphic projection's article.

FIG. 1 illustrates a schematic block diagram of a system 101 for obtaining a series of photographs of a product 102 for three-dimensional modelling in accordance with the principles of the present invention. In taking pictures with the final viewable model in mind, one of ordinary skill in the art can determine the number of pictures and views needed for a complete 360-degree view of the product 102, complete spherical view of the product 102, multiple zoom levels thereof for the product 102, and/or any partial rotational view thereof. By way of example, a smaller product, such as a ring may require 12 photographs in order to display a complete corresponding 360-degree view, whereas a larger product, such as a car, may require many more pictures. In embodiments for larger products, offset axis view and rotational views may be possible, such that a part or aspect of the product may become the focal point of rotation, rather than the center axis of the product.

In taking pictures sufficient for later generating and providing the 360-degree view of the product, the system 101 may comprise a lightbox 100 such that the product 102 may be photographed from one or more angles under diffuse light to minimize surface shadows at each angle. The lightbox 100 may comprise a cube having light diffusers, such as white tissue paper, covering each side of the interior of the lightbox 100 for a uniform background. Furthermore, the system 101 may have one or more lights behind one, but preferably behind four, five, or six diffusers. Each of the lights may be of similar wattage, power, lumens, color, etc. such that an even light is produced within the lightbox 100.

The product 102 may be placed, such as on a pedestal within the center of the lightbox 100. One or more orbits at a predetermined distance may be chosen. For example, a first orbit 104 and a second orbit 106 may be set at respective predetermined radiuses from the product 102. At each orbit, a camera 108 may be placed and a still photograph taken of the product. The position may be recorded corresponding to the picture, such as the XY coordinates or the radial coordinates. In this manner, multiple pictures around the corresponding orbit may be correlated to identify nearest neighbor pictures. For example, 60, or even up to 360, evenly spaced positions about each orbit may be taken and recorded with the corresponding positional data.

The object may be rotated pictures taken about the orbits in the Y-Z and/or X-Z planes. These pictures may be taken in one or more orbits similar to those take in the X-Y plane.

The photographs corresponding to each orbit in each plane may constitute a set of photographs. In some embodiments, one or more sets of photographs may be combined to create a three-dimensional rotational view of the product 102 in the corresponding plane. This can be accomplished due to the overlapping areas of each neighboring photograph. By overlaying the overlapping portion of each photograph, a three-dimensional model of the product 102 can be created. In some embodiments, the set of photographs may be stored separately and cycled upon user input to simulate three-dimensional modelling. However, embodiments include generating a three-dimensional model, such as a wireframe model and overlaying the photographs on the wireframe. Further embodiments include time of flight photography to model the surface of the product 102 from each angle. The surface topography and the overlapping visual data of the neighboring photographs may be combined to generate the three-dimensional model.

In some embodiments, the three-dimensional model may be stored as a set of pictures to be cycled to simulate a three-dimensional model. In other embodiments, positional data may be stored, such as camera position data, topographical time-of-flight data, and/or surface data estimated from trigonometric surface position data. For example, for each corresponding orbit, the radius may be predetermined. The time-of-flight data may correspond to the distance between the camera 108 and an array of positional data and color data of the corresponding surface of the product 102. The time-of-flight distances may be subtracted from the predetermined radius to determine a topographical surface distance from the center of the product 102. Furthermore, this time-of-flight distance may further be adjusted for the angle of surface position from the camera 108. By way of example, this adjustment may be based on a predetermined height, width, and depth of the product 102. Furthermore, with a predetermined radius representing the distance from center of the product 102 to camera 108, the height, width, and/or depth can be used to trigonometrically calculate the angle to each corresponding surface position from each camera position in a set of photographs. As such, a plurality of positions around the product 102 may be stored in correlation, such as a table, array, dictionary, etc. that relationally stores the topography (e.g. distance from center) of the product 102 with correlation to the color data (e.g. RGB color data, CYMK color data, etc.).

By way of example, the camera 108 may be mounted on a telescopic orbital pole 112 that may be extend from a platform 110 supporting the product 102. The orbital pole 112 may rotate at the connection to the platform 110 such that camera 108 may orbit about the product 102. In further embodiments, a motor may rotate gears that drive rotation of orbital pole 112 and orbit of the camera 108. In this manner, the photographing process may be automated once the product and the camera 108 are placed inside the lightbox 100. Thus, the diffusers can be placed on the lightbox 100 without disturbance until the photographing process is completed. In some embodiments, the processor may start the photographing process, including number of photographs, distance, and or movement speed. Each of these may be set and/or started by user input.

Figure 2:
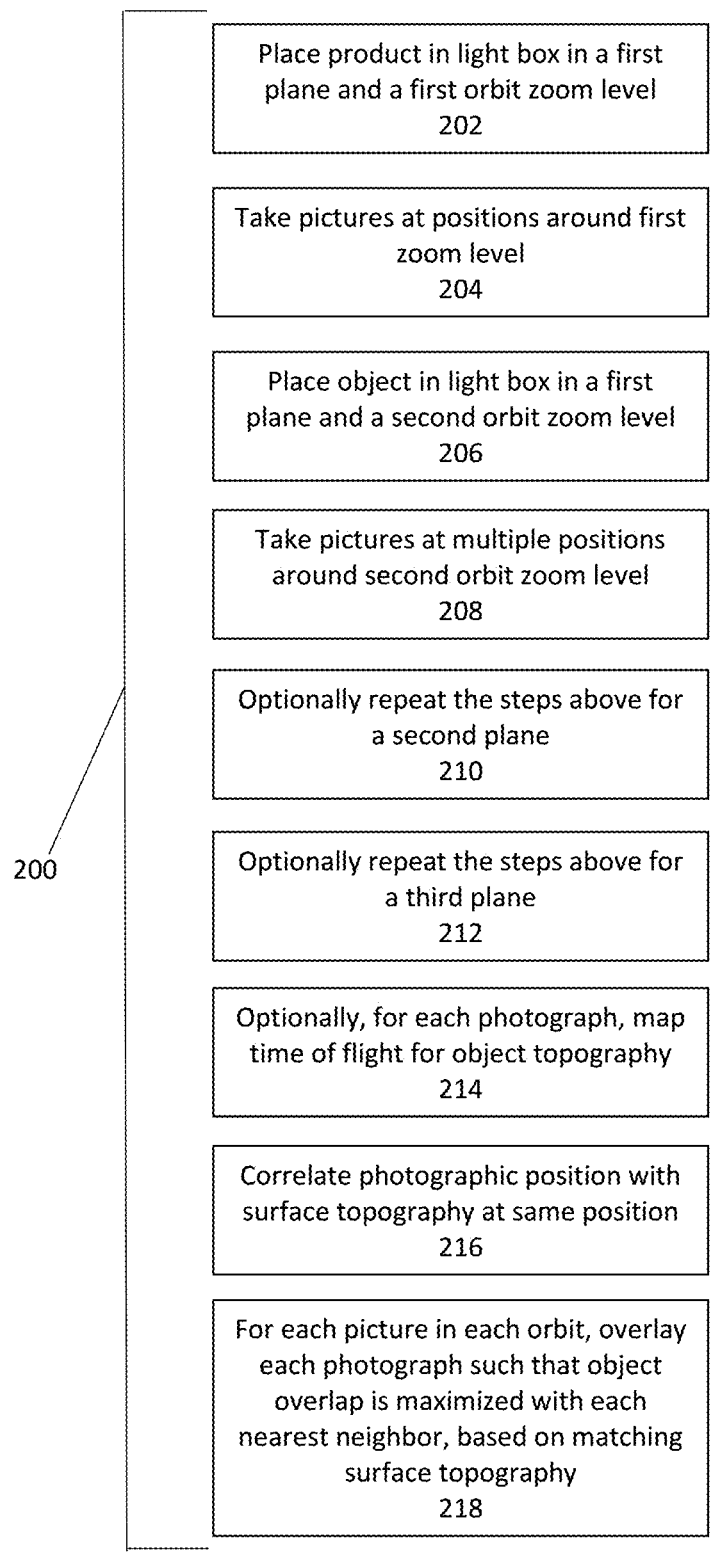
FIG. 2 illustrates is an exemplary flowchart of a method for obtaining the series of photographs of the product for three-dimensional modelling through photo stitching in accordance with the principles of the present invention.

FIG. 2 illustrates is an exemplary flowchart of a method 200 for obtaining the series of photographs of the product for three-dimensional modelling in accordance with the principles of the present invention. In step 202, the product 102 may be placed in the lightbox 100. For example, the product may be placed upright. The camera 108 may be placed at a first zoom level. The camera 108 may be orbited about the product 102 and facing the product 102 at all points from a uniform radius from the product 102. As the camera 108 is orbited about the product 102 in step 204, pictures may be taken from multiple positions around the first zoom level. For example, there may be minimally four pictures taken corresponding to the four faces of the lightbox 100. However, many embodiments may include from 60 to 360, inclusive, positions, each roughly evenly spaced apart along the orbit. In some embodiments, a second orbit zoom level may be selected in step 206 and multiple pictures taken around the second zoom orbit level in step 208. Picture taking at the second orbit zoom level may correspond to those taken at the first orbit.

In step 210, the product 102 may optionally be rotated to another plane, such that the camera orbit may correspond to the X-Z or Y-Z plane of the product 102, relative to the upright position of the product 102. Step 210 may comprise photographing the product 102 one or more orbit zoom levels as well. Step 210 may be similar to the steps 202, 204, 206, 208, and 210 in the corresponding plane of step 210.

In step 212, the product 102 may be optionally be rotated to capture the remaining corresponding Y-Z or X-Z plane of the product 102, relative to the upright position of the product 102. Step 212 may comprise photographing the product 102 from one or more orbit zoom levels. Step 212 may be similar to the steps 202, 204, 206, 208, and 210 in the corresponding plane of step 212.

In step 214, the photographs may optionally be coordinated to a topography of the product 102, such as by time-of-flight analysis in some embodiments. However, embodiments include simply overlaying pictures based on overlapping portions of product 102 contained in the corresponding neighboring pictures such that up to a 360-degree view of the product 102 may be created. Up to a full 360-degree view of the product 102 for each zoom orbit may later displayed, such as in a browser or app. Alternatively, an entire spherical view per zoom level of the product 102 may later be displayed based on the combined pictures of the product 102. In fact, views may be interpolated between zoom orbit levels and any position on a viewing sphere to provide views of the product from any point of view about the product 102. For example, a full 360-degree view may be presented, a fully spherical view may be presented, and/or a fully zoomable view may be presented. As such, embodiments include storing correlating the position of the camera 108 and the product 102 with the time-of-flight data to associate portions of the corresponding photograph with depth and/or topography of the product 102, in step 216. In some embodiments, the entire view may be transferred and loaded together. In other embodiments, neighboring sections may be loaded dynamically as the rendered image is displayed.

In step 218, the overlapping portions of neighboring pictures in each corresponding orbit may contain significant similar portions that may be overlaid to generate a 360 mapping of the product 102. This can be accomplished by pairing each picture and each of its nearest neighbors separately in pairs. The pairs of pictures may be tested at each pixel position to compare overlapping pixels, such as those with similar RGB values. Each possible position can be tested, and a score calculated based on adding a point for each similar pixel. The position of highest score may be used to fit the overlaying portions of the product 102 in the respective pictures together into a single image with the overhanging pixels added to capture a wide angle of the product 102. By repeating the process with each nearest neighbor picture, an entire 360-degree view of the product 102 may be generated. In some embodiments, this continuous view may be stored. However, embodiments include also estimating distance at each pixel position based on the height, width, and depth of the product 102. In some embodiments, the surface position may even be measured, such as by time-of-flight camera, for fitting the photographs and later displaying the photographic model.

In some embodiments, the steps of FIG. 2 may be performed by a server upon uploading the individual pictures to the server. The resulting three-dimensional photographic model may be downloaded to a computer, such as that of the uploading user.

Figure 3:
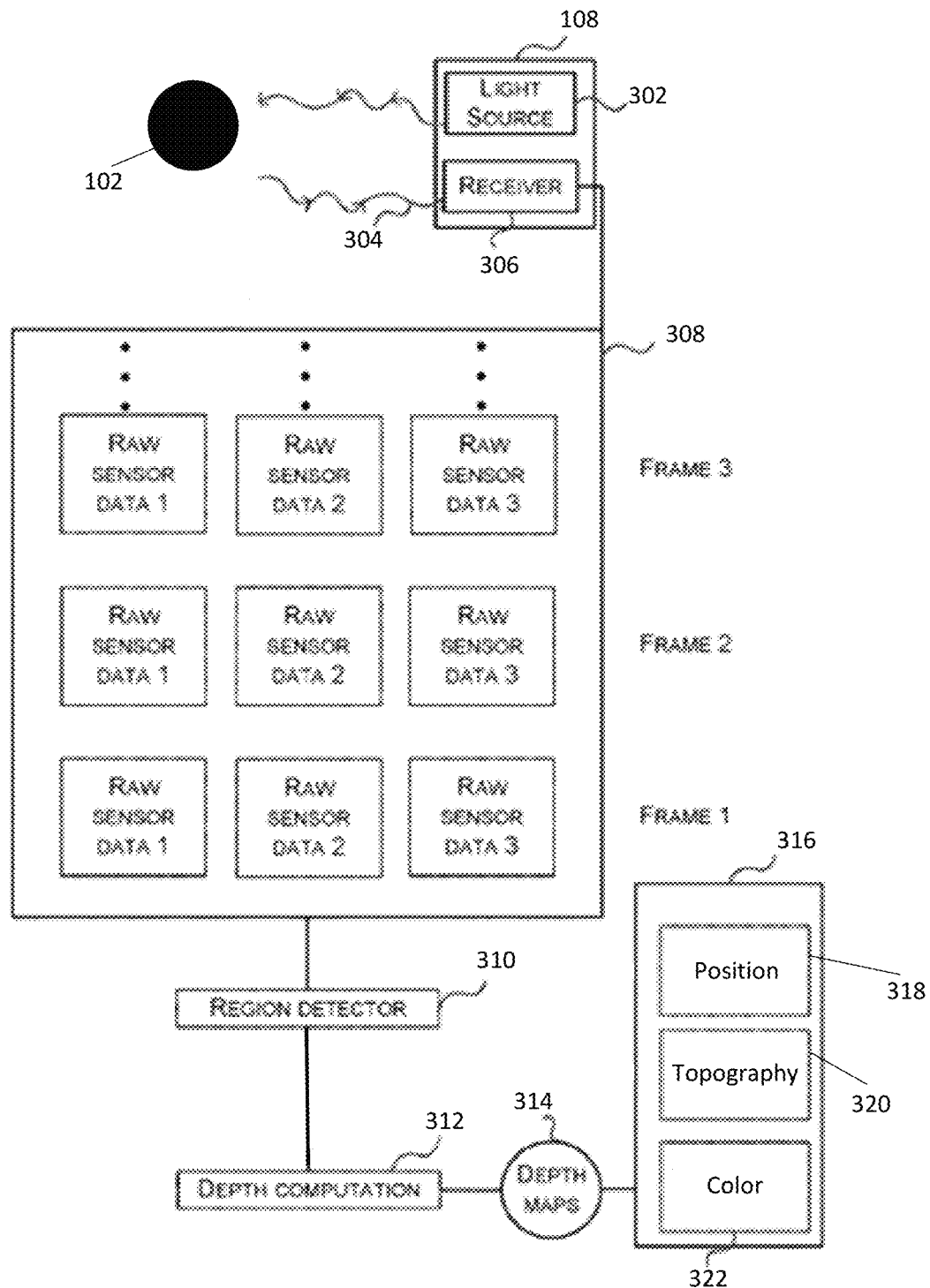
FIG. 3 illustrates a block-level diagram of a camera, similar to that of U.S. Pat. No. 10,311,282, that may be used for obtaining the series of photographs of the product for three-dimensional modelling through photo stitching in accordance with the principles of the present invention.

FIG. 3 illustrates a block-level diagram of the camera 108 that may be used for obtaining the series of photographs of the product for three-dimensional modelling in accordance with the principles of the present invention. In some embodiments, the camera 108 may simply capture reflected light from the product 102 at each position in a set of photographs. In other embodiments, the camera 108 may be a time-of-flight camera that further provides a light source that provides a wavelength of light that does not conflict with the wavelengths provided from outside the lightbox 100. Therefore, the camera 108 may comprise a light source 302, such as an infrared light source. The light source may cast light on the product 102 for calculation of distance based on the known speed of light and time to receive the light. Reflected light 304 may be reflected from the product 102. The reflected light 304 may comprise light provided from the light sources outside the lightbox 100. In some embodiments, the reflected light 304 may comprise light provided from the light source 302. The receiver 306 may receive the reflected light 304. Furthermore, the camera 108 may be similar in all respects to a computer, described herein. The camera 108 may comprise a processor 308 such that a table of datapoints may be stored. For example, the raw sensor data may comprise color data, lighting data, and/or distance data at each point in the frame (e.g., calculated from the time-of-flight from light provided by the light source to reception by the receiver based on the known speed of light).

The camera 108 may comprise a region detector 310, or the region detector 310 may be embodied on a separate computer that is configured to receive the raw sensor data from the camera 108. In some embodiments, the region detector 310 may be embodied as a software embodied on a processor. The region detector 310 may be configured to group the time-of-flight, color, lighting, and/or averages thereof into corresponding regions, such as for generating a photographically skinned wireframe of the product 102. In alternate embodiments, the time-of-flight data, color data, and lighting data may be stored in raw format.

The camera 108 may comprise a depth computation 312, the depth computation 312 may be embodied on a separate computer, or as software on a processor. In some embodiments, the depth computation 312 may use the time-of-flight data to calculate a depth and/or topography of the product 102. For example, this may be simply estimated based on subtraction of the depth, e.g., based on the time-of-flight and known speed of light, from the corresponding predetermined radius of the orbit. In other embodiments, a trigonometric angle based on the predetermined radius and the height, width, and depth of the object may be used to first calculate the deviation of the surface from the plane of the corresponding orbit to further determine the exact distance to the surface of the product 102 at the corresponding point.

The surface topography of the product 102 may be compiled and stored as one or more depth maps 314. For example, a depth map 314 per photograph may be stored. However, there may be double storage of overlapping areas. Therefore, depth maps 314 of predetermined sections may be stored, wherein each section corresponds to a predetermined number of nearest neighbors. In further embodiments, the entire topography of the product 102 may be stored in a single depth map 314, such as when an entire wrap of the product is stored. Similarly, color 322, such as including lighting data may be stored in the depth maps 314, or in separate corresponding photograph maps by photograph, by predetermined sections, and/or of the entire product 102.

By way of example, the depth maps 314 may be stored in a depth map data 316. The depth map data 316 may be stored in a single binary large object (blob) or object or as a relationally stored set of data. The depth map data 316 may include a position 318, such as cartesian coordinates, polar coordinates, or other relational coordinates of one or more points corresponding to one or more points on the surface of the product 102. The depth map data 316 may further include topography 320, which may include grouping of two or more positions for surface shape and/or color 322. The depth map data 316 may further include color 322, which may include color values, such as RGB values at the corresponding position, and/or lighting data, such as brightness, contrast, tint, and/or camera data corresponding to F-stop, ISO, exposure, and aperture during each shot. These data may be used for adjustment relative to neighboring pictures to uniformly provide a three-dimensional effect of the product 102. In some embodiments, the depth map data 316 may comprise an array, or an array of arrays, that relationally store pointers to the position 318, topography 320, and/or color 322. In this manner, the depth map data 316 may be used to recreate a three-dimensional effect for a user-interactive set of images to emulate real-time rotation of a photographic wrap and/or photographic quality model of the product 102.

Therefore, the depth map data 316 may be calculated on the camera 108. In alternative embodiments, the depth maps 314 calculations may be made on a separate computer and/or server. Furthermore, each picture may be sent to a separate computer and/or server for processing into the model or relational data for use as a model of the product 102. Therefore, data storage in one or more steps of method 200 may be embodied on storage of the camera 108, a separate computer, such as that of the camera user, and/or a server, such as that used to provide the model of the product 102 to buyers.

Figure 4:
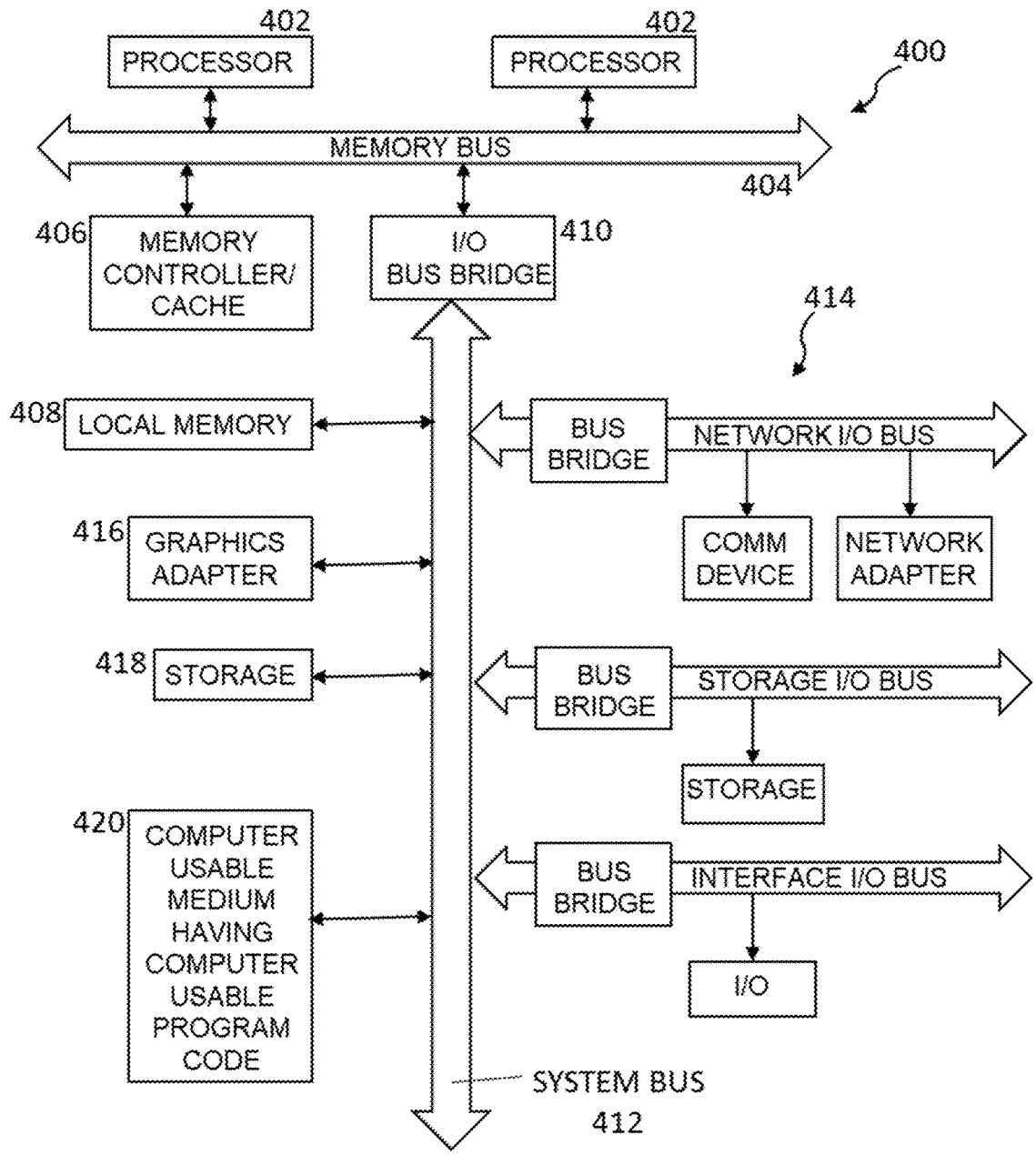
FIG. 4 illustrates a block-level diagram of a computer in accordance with the principles of the present invention.

FIG. 4 illustrates a block-level diagram of a computer 400 in accordance with the principles of the present invention. The computer 400 may be embodied on the camera 108, the server, and/or an external computing device.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. For example, FIG. 4 illustrates a block-level diagram of the computer 400 in accordance with the principles of the present invention These computer program instructions may be provided to a processor 402 of the computer 400, which may include a general purpose computer, special purpose computer, or other programmable data processing apparatus to produce a machine, such that the instructions, which execute via the processor 402 of the computer 400 or other programmable data processing apparatus, create means for implementing the functions/acts specified in the flowchart and/or block diagram block or blocks.

These computer program instructions may also be stored in a computer readable medium 420 that can direct the computer 400, other programmable data processing apparatus, or other devices to function in a particular manner, such that the instructions stored in the computer readable medium 420 produce an article of manufacture including instructions which implement the function/act specified in the flowchart and/or block diagram block or blocks. Furthermore, instructions in the computer 400 may be embodied and implemented through an existing operating system, such as Windows, Linux, Apple iOS, OSX, Unix.

The computer program instructions may also be loaded onto the computer 400, a microcontroller, other programmable data processing apparatus, or other devices to cause a series of operational steps to be performed by the computer 400, other programmable apparatus or other devices to produce the computer 400 implemented process such that the instructions which execute on the computer 400 or other programmable apparatus provide processes for implementing the functions/acts specified in the flowchart and/or block diagram block or blocks.

The computer 400 may comprise a symmetric multiprocessor (SMP) system or other configuration including a plurality of processors 402 connected to memory bus 404. By way of example, the memory bus 404, the system bus 414, and/or the component buses 414 may comprise one or more of a control buses, a data bus, and/or an address bus. Alternatively, a single processor 402 may be employed. Also connected to memory bus 404 may be a memory controller/cache 406, which may provide an interface to local memory 408. An I/O bridge 410 may be connected to the memory bus 404 and may provide an interface to an I/O bus bridge 410 and subsequently to system bus 412. The system bus 412 may comprise a communication system that transfers data between components inside a computer, or between computers, such as via one or more component buses 414, including all related hardware components and software, including communication protocols necessary for data transfer. The I/O bus bridge 410 may be utilized to support one or more buses and corresponding devices over component buses 414, such as bus bridges, input output devices (I/O devices), such as a mouse, keyboard, monitor, storage, network adapters, etc. Thus, a network adapter may be coupled to the system to enable the data processing system to become coupled to other data processing systems or remote printers or storage devices through intervening private or public networks.

Also connected with the I/O bus bridge 410 may be devices such as a graphics adapter 416, storage 418 and a computer usable storage medium 420 having computer usable program code embodied thereon. The computer usable program code may be executed, e.g., by the processor(s) 402 to implement any aspect of the present invention, for example, to implement any aspect of any of the methods, processes and/or system components illustrated in any of the figures of the present application. Moreover, the computer usable program code may be implemented in the local memory 408 or other suitable storage medium. The storage 418 may store resources useful in implementing the features previously described. For instance, the storage 418 can store the computer instructions which, when executed, implement any of the methods or actions disclosed herein.

The computer 400 may comprise a processing unit (CPU) 402, local memory 408, peripherals and interfaces, and a general-purpose input/output (I/O) interface. The computer 400 may further comprise local storage 418. The local storage 418 may be used to store variables for complex calculations. The local memory 408 may interface with the CPU 402 via a memory interface. The memory interface may allow storage of calculated values, variables, constants, or any other important electronic signals onto the physical local memory 408. The memory interface may include one or more direct memory access controllers. Of course, part or all of the local memory 408 may be committed to the computer usable storage medium 420, in which data relevant to the operation of the program is stored. The computer usable storage medium 420 may also be organized into useful data structures such as a stack or heap. The peripherals and interface and the general purpose I/O interface may interface to external input or output devices. Examples of external input or output devices include any electronic device capable of sending or receiving an electronic signal such as keyboards, mice, printers, scanners, digital sensor, analog sensors, Ethernet, analog to digital converters, ADC, UART, USB etc. The computer usable storage medium 420, local memory 408, peripherals and interface, and general purpose I/O interface may be contained on the circuit board of the CPU 402. In other embodiments, any of these parts may be external to the CPU 402.

The computer 400 may be configured for acquiring photographs, topographical, positional data, etc. for generating the photographic three-dimensional models in accordance with the principles of the present invention. For example, the computer 400 may be capable of receiving the model generation data over an input interface and sending the modelling data over an output interface. The computer 400 may also perform operations on and modify the model generation data to generate the three-dimensional model and modelling data.

Figure 5:
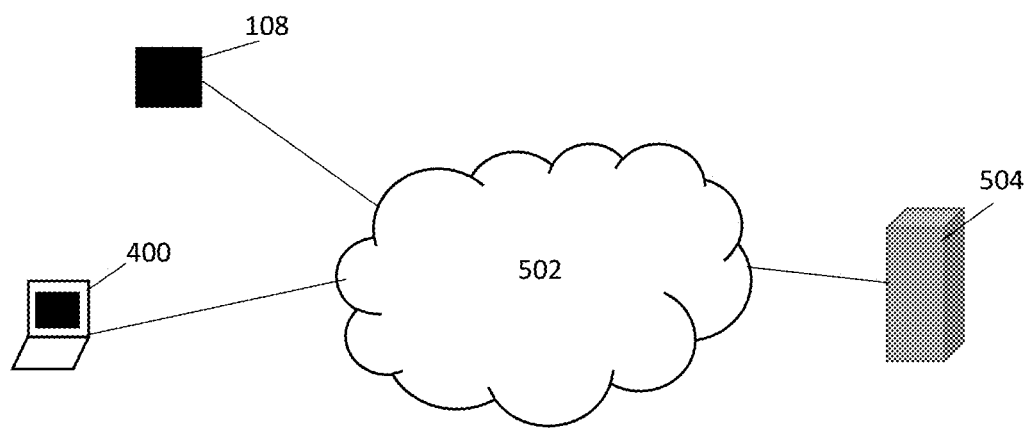
FIG. 5 illustrates an electronic connection of the camera, the computer, and a server in accordance with the principles of the present invention.

FIG. 5 illustrates an electronic connection of the camera 108, the computer 400, and a server 504 in accordance with the principles of the present invention. For example, the camera 108, the computer 400, and the server 504 may be connected such as over internet 502. The internet 502 may comprise a cluster of networked computers that route traffic over servers, routers, and/or switches, such as by an Internet Service Provider, from a computer to a server by Internet Protocol addresses. Therefore, the computers may be connected directly, such as by crossover Cat5e cable, Bluetooth, or other known local connections, over a local network by a wireless and/or wired connection to a router, and/or by connection through one or more other computers.

The camera 108 may be connected to internet 502 to further communicate electronically with server 504. For example, the camera 108 may send photographs, time-of-flight data, and/or processed depth map data 316, or any information from any step-in method 200 to the server 504. However, the camera 108 may perform any such step using an onboard processor and memory. In some embodiments, the server 504 may perform the processing of the raw or compressed photograph data sent to the server 504 from the camera 108. Embodiments also include an intervening computer of the camera user, similar to computer 400 in all respects, such that processing of one or more steps from method 200 and or data structures in FIG. 3 may be generated and/or embodied on the camera user's computer. This computer may then send one or more data to the server 504.

In certain embodiments, the camera 108, the computer 400, and/or the server 504 may follow the computing model in which each comprises one or more of a view, a data model, and a controller to update changes to the view and/or data model. In this manner, the camera 108, computer 400, and/or server 504 may comprise a user interface for receiving input events to change the data model and/or view based on the corresponding event. Furthermore, the camera 108, the computer 400, and/or the server 504 may receive a network input event to change the data model and/or view based on the corresponding event.

Computer 400 may be further connected to the server 504, such as by way of the internet 502. In this manner, computer 400 may server as a buyer's computer for querying a webpage from the server 504 over the internet protocol. In some embodiments, the server 504 may be similar in all respects to the computer 400. The server may receive internet protocol queries for a corresponding webpage and may serve the webpages over the internet.

Example webpages include a webpage for receiving a plurality of pictures corresponding to a panoramic rotation around the product 102, processing the pictures into a product data model, such as the depth map data 316, and/or a 360 degree overlay view, and then returning the processed data and/or view back to the computer 400 for download.

Further webpages include those corresponding to a shopping website that may include depictions of the product 102. However, instead of independent pictures of the product, the server 504 may provide the depth map data 316, a portion thereof, and/or a 306 degree overlay view, and/or a portion thereof to the computer 400. The computer 400 may display this depiction on a screen based on the view data model. The computer 400 may then receive corresponding user input through peripheral devices, such as a mouse or keyboard. This input may be transmitted from the computer 400 to the server 504 as an input event to further load additional visual data related to the product 102 from the server 504, as will be described further below. Additional webpages may present a shopping cart and checkout system such that the product may be placed in the cart and purchased for shipment.

Figure 6:
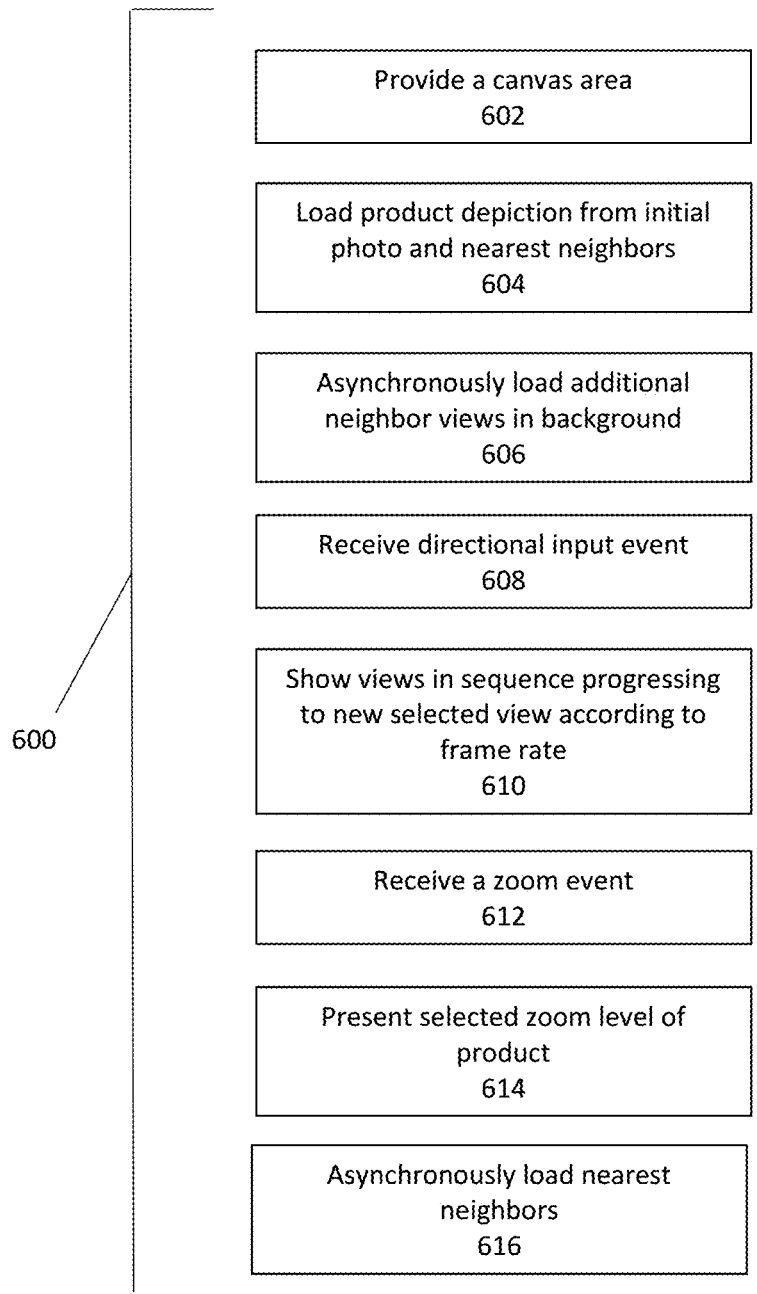
FIG. 6 illustrates an exemplary flowchart of a method of dynamic loading and rendering the three-dimensional product view for simulation of a three-dimensional model through photo stitching in accordance with the principles of the present invention.

FIG. 6 illustrates an exemplary flowchart of a method of dynamic loading and rendering the three-dimensional product depictions in accordance with the principles of the present invention. In some embodiments, user experience when buying a product, such as product 102, may be increased by touching and/or reviewing the product from all views. In typical e-commerce transactions, the buyer is limited to a handful of pictures from a few predetermined views. However, embodiments of the present invention may allow the buyer a photorealistic three-dimension-like model for inspection and review before purchase. Therefore, embodiments of the present invention include a method 600 of displaying a model of the product 102.

In step 602, a canvas may be provided, such as in a webpage provided by a server that is similar in all respects to the computer 400. For example, HTML5 may be used to embed a canvas area, a video area, a plugin area (e.g., adobe, flash, etc.) that may receive user input, such as click-and-drag and/or keypresses. The user input may be received directly by computer 400 and then transferred to server 504 as an input event. The user input may be received by the server 504 and the server 504 may present the next corresponding view of the product 102 in relation to the corresponding camera position selected by the user input. This position may be tracked by coordinate and/or in series such that each position is mapped to another neighboring position based on the possible user input events.

In step 604, a default view comprising an initial position, viewing angle, and zoom level may be activated upon loading the canvas. Thus, an initial picture of the product 102 may be presented to the buyer via the canvas on the computer 400 based on the initial product display data received from the server 504. The canvas area may be capable of receiving user input, such as regarding rotation of the product 102 and/or altering the zoom level. In some embodiments, receiving a mouse-wheel in may alter the displayed zoom level closer by loading a model associated with a closer zoom level orbit and/or shifting the zoom level of the model of the product 102. Changing the view to emulate zooming may occur seamlessly such that the viewer sees a fully 360-degree or fully spherical and smoothly zoomable view of the product at each zoom level and/or any point in between zoom orbit levels. In turn, receiving a mouse-wheel out may alter the zoom level further by loading a model associated with a further zoom level orbit. For example, loading a zoom level orbit may comprise loading an entire set of photographs of the product 102, loading a set of nearest neighbor photographs, loading a single photograph, and/or loading an entire product model.

In embodiments wherein a single photograph or a set of nearest neighbor photographs may further comprise loading additional neighbor sections and or photographs in the background, asynchronously, in step 606. This data may be received by the computer 400 from the server 504 and held in the data model of the computer 400 such that the view of computer 400 may be updated with the next visual product data selected by user input event without intervening downloading from server 504. Then, the nearest neighbor data may be downloaded from the server 504 and stored in the background in computer 400. In this manner, the asynchronously loaded photographs may be loaded while the displayed photographs are already presented to the buyer such that loading of the photographs appear seamless to the buyer. In some embodiments, the canvas may receive a directional input event from the user in step 608, such as a directional arrow keypress and/or a directional icon click. Upon receipt of the directional user input event, such as up, down, left, and/or right, a new position may be calculated. The canvas may be redrawn to present the pictures and/or model from the new positioned, and step 606 may be repeated to asynchronously load the next possible positions. In some embodiments, transition between two positions may include showing a sequence of pictures to animate movement of the product from the position to the next position corresponding to the input, in step 610.

In step 612, a zoom event, such as a mouse-wheel in, mouse-wheel out, ctrl+click-and-drag event, and/or or icon click input event, may be received by the computer 400 and may be further sent to the server 504. The zoom level may then be changed in the data model to then change the depiction of the product 102 in the view in step 614. Upon this event, the next picture corresponding to the newly selected zoom orbit and position may be loaded and displayed. Furthermore, the nearest neighbor pictures and or sections may be asynchronously loaded in the background in step 616 to avoid lag when selecting the next position along the corresponding orbit zoom level.

In some embodiments, the visual product data, such as 360-degree view pictures, sections thereof, depth map data 316, and/or sections thereof (e.g., the product visual data) may be stored on a distribution of servers similar to server 504. In this manner, the product visual data may be download from the fastest source, and/or portions downloaded from multiple sources to speed up downloading in the case of slow and/or throttled connection with on such server. In this manner, the buyer may experience a seamless modelling and rotation of a three-dimension-like model of the product 102 in the browser when shopping for the product 102.

Figure 7:
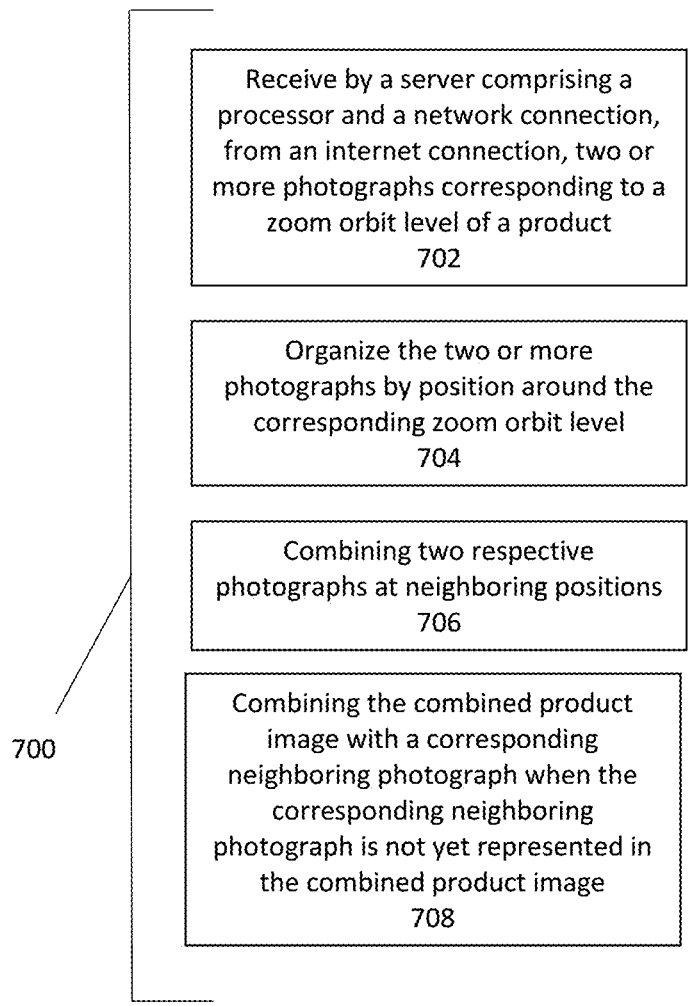
FIG. 7 illustrates an exemplary flowchart of a method of combining two or more views of a product through photo stitching in accordance with the principles of the present invention.

FIG. 7 illustrates an exemplary flowchart of a method 700 of combining two or more views of the product 102 of FIG. 1 in accordance with the principles of the present invention. The method of FIG. 7 may be embodied on a server, such as server 504, in order to generate a three-dimensional view and/or photographic model. In step 702, the server 504 may receive over the internet connection, two or more photographs of the product 102 from different angles, such as those taken from two or more positions of a zoom orbit level, such as obtainable from the structures of FIG. 1. In some embodiments, computer 400 may send these two or more photographs to the server 504.

The two or more photographs may be organized by position around the corresponding zoom orbit level in step 704. By way of example, the positions may be provided to the server 504 by the computer 400 and/or by the camera 108 based on the camera 108 position on the corresponding zoom level orbit. In this manner, the server 504 may associate the positions of the received product photographs to categorize nearest neighbor photographs.

In step 706, a combined product image may be generated by combining two respective photographs from neighboring positions. By way of example, many photographs comprise a matrix of color data associated with positions the camera "sees" on the picture. This matrix can be correlated with the viewing angle and camera position, such as trigonometrically and/or by time of flight data, to correlate combining multiple pictures. Furthermore, multiple pictures can be correlated based on position to stitch together several angles to create a continuous wrap of the subject, including up to a 360-degree three-dimensional wrap. In this manner, such a wrap may be created for product 102.

The photographs of the present invention may further comprise surface data, time of flight data, and/or distance data further associated with the matrix position. Generating the combined product view may further comprise selecting an overlaid position of the two respective photographs in which a count of one or more similar overlapping pixels may be maximized, wherein a similar overlapping pixel is determined by one or more of color value, position, and time of flight; retaining the one or more similar overlapping pixels in a combined product image; and appending one or more nonoverlapping pixels to a corresponding pixel position to generate the combined product image to represent a combined view from the respective angles of the two respective photographs.

In step 708, the combined product image may further be combined with one or more corresponding neighboring photograph when the corresponding neighboring photograph is not yet represented in the combined product image. This process may be repeated until all received photographs of the product 102 are represented in the combined product image.

In some embodiments, the computer 400 may download the combined product image from the server 504, such as in a single image file or as multiple corresponding files combinable for viewing the combined product image on the computer 400. Embodiments also include displaying the combined product image as a three-dimensional product image in an app, a webapp, desktop application, and/or a webpage.

Figure 8:
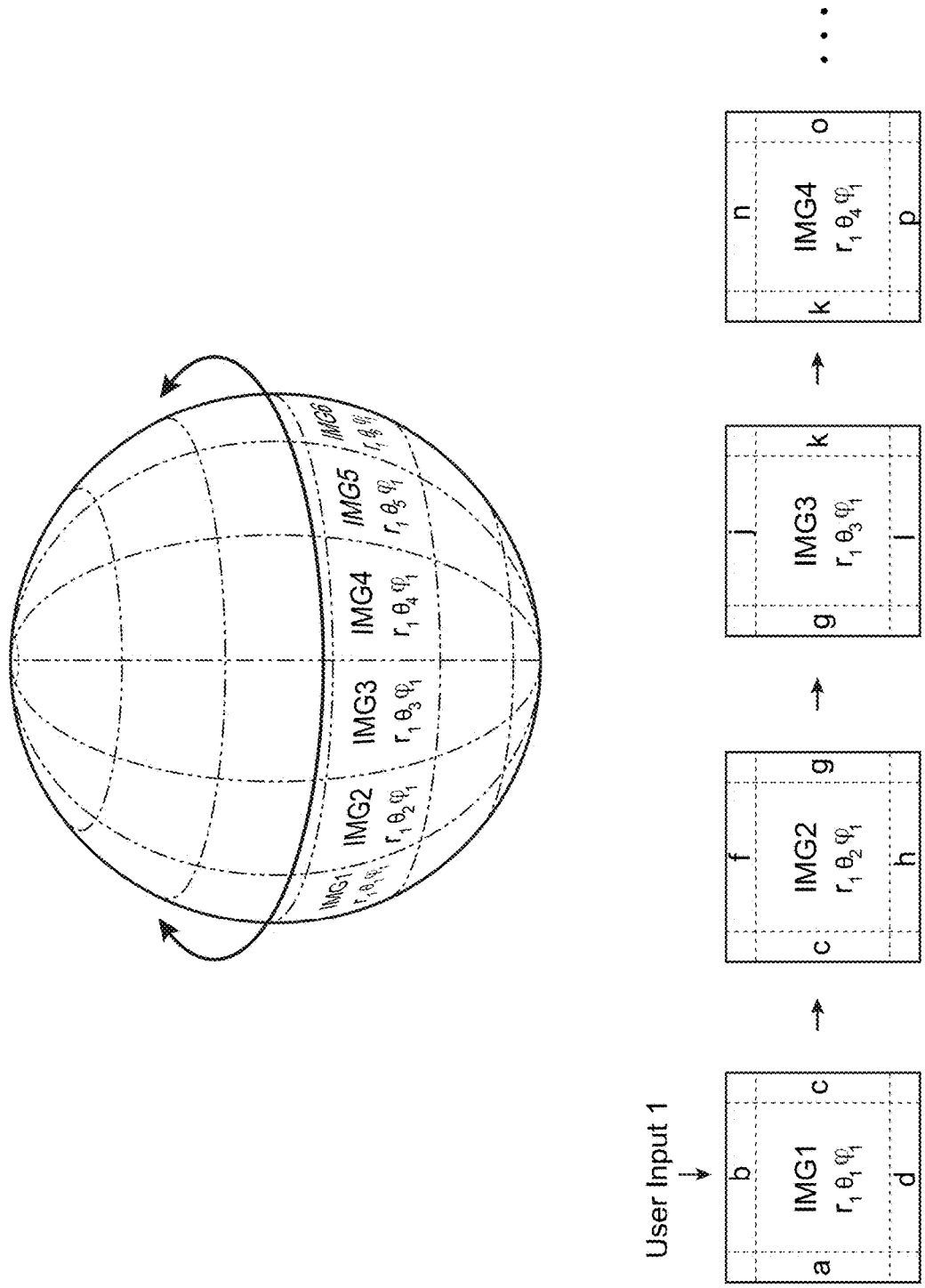
FIG. 8 illustrates a globe resulting from the photo stitching of individual, discrete pictures from various angles around the object and horizontal rotation of the globe through a first user input.

FIG. 8 illustrates a globe resulting from the photo stitching of individual, discrete pictures from various angles around the object and horizontal rotation of the globe through a first user input. Such a user input, User Input 1, may comprise clicking a button corresponding to horizontal rotation or scrolling a mouse wheel to rotate the model depicted within the globe in a horizontal direction. By way of example, the globe housing IMG1 may be formed by all pictures around an object a corresponding zoom orbit with the globe centered on IMG1 from the point of view of the user viewer. Upon horizontal scrolling, IMG1 may be followed by centering IMG2 in the viewer, which may be represented in polar coordinates as having theta-2 less than theta-1 in the present example. Similarly, upon further rotation, the images may proceed to IMG6 in the series or beyond. By way of example, intermediate images may be shown between the starting image and the ending image such that smooth scrolling may show a clean animation. The dotted lines may further depict locations where neighboring photographs or combinations of photographs are joined side-by-side for seamless rendering of a model of the object. For example, sections a-l may be labeled, in which "c," "g," and "k" are the same to illustrate overlap of the same depiction within neighboring photographs or combinations of photographs.

Figure 9:
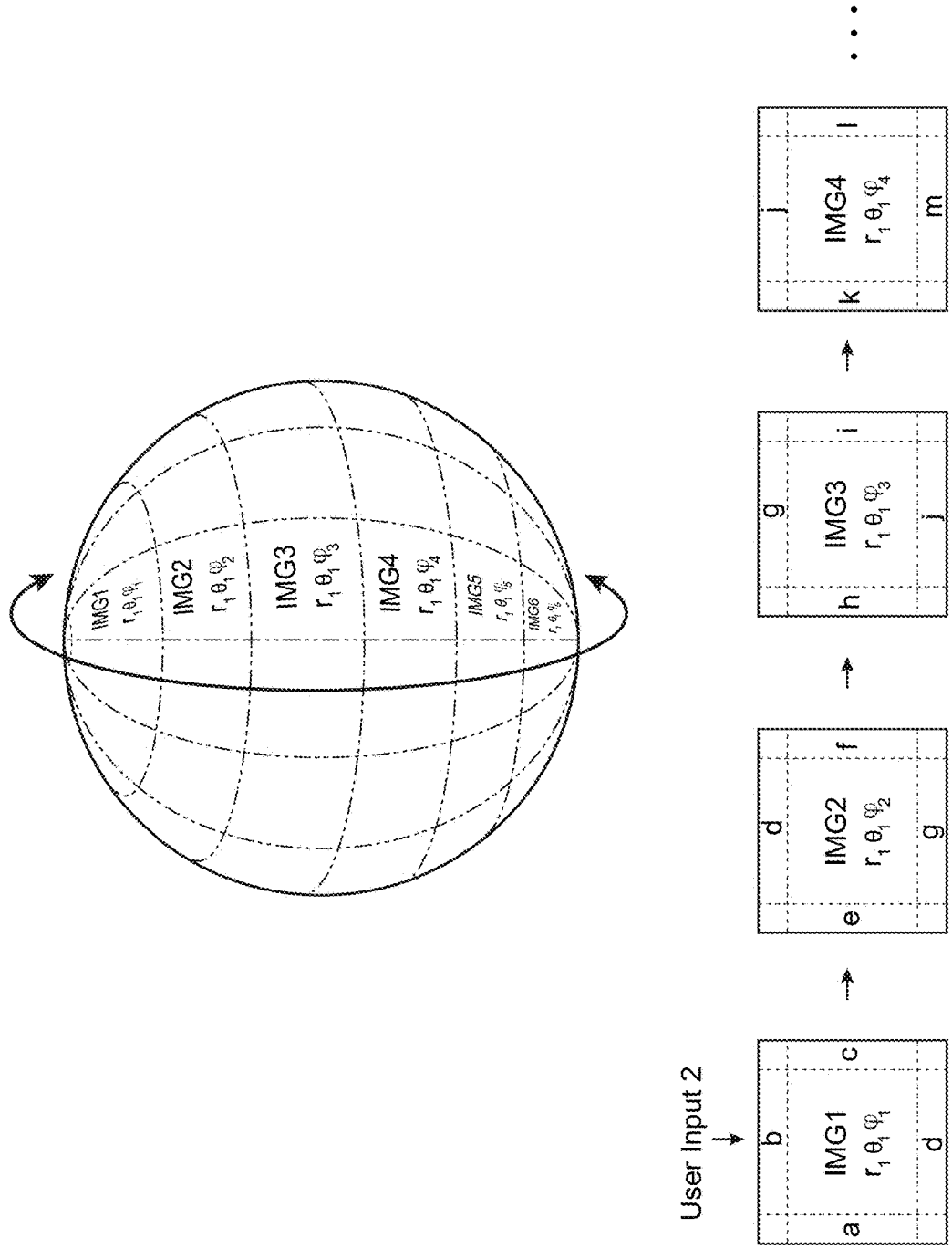
FIG. 9 illustrates the globe of FIG. 8 and vertical rotation thereof based on a second user input.

FIG. 9 illustrates the globe of FIG. 8 and vertical rotation thereof based on a second user input. Such a user input, User Input 2, may comprise clicking a button corresponding to vertical rotation or scrolling a mouse wheel to rotate the model depicted within the globe in a vertical direction. By way of example, the globe housing IMG1 may be formed by all pictures around an object a corresponding zoom orbit with the globe centered on IMG1 from the point of view of the user viewer. Upon vertical scrolling, IMG1 may be followed by centering IMG2 in the viewer, which may be represented in polar coordinates as having phi-2 less than phi-1 in the present example. Similarly, upon further rotation, the images may proceed to IMG6 in the series or beyond. By way of example, intermediate images may be shown between the starting image and the ending image such that smooth scrolling may show a clean animation. The dotted lines may further depict locations where neighboring photographs or combinations of photographs are joined side-by-side for seamless rendering of a model of the object. For example, sections a-l may be labeled, in which "d," "g," and "j" are the same to illustrate overlap of the same depiction within neighboring photographs or combinations of photographs.

Figure 10:
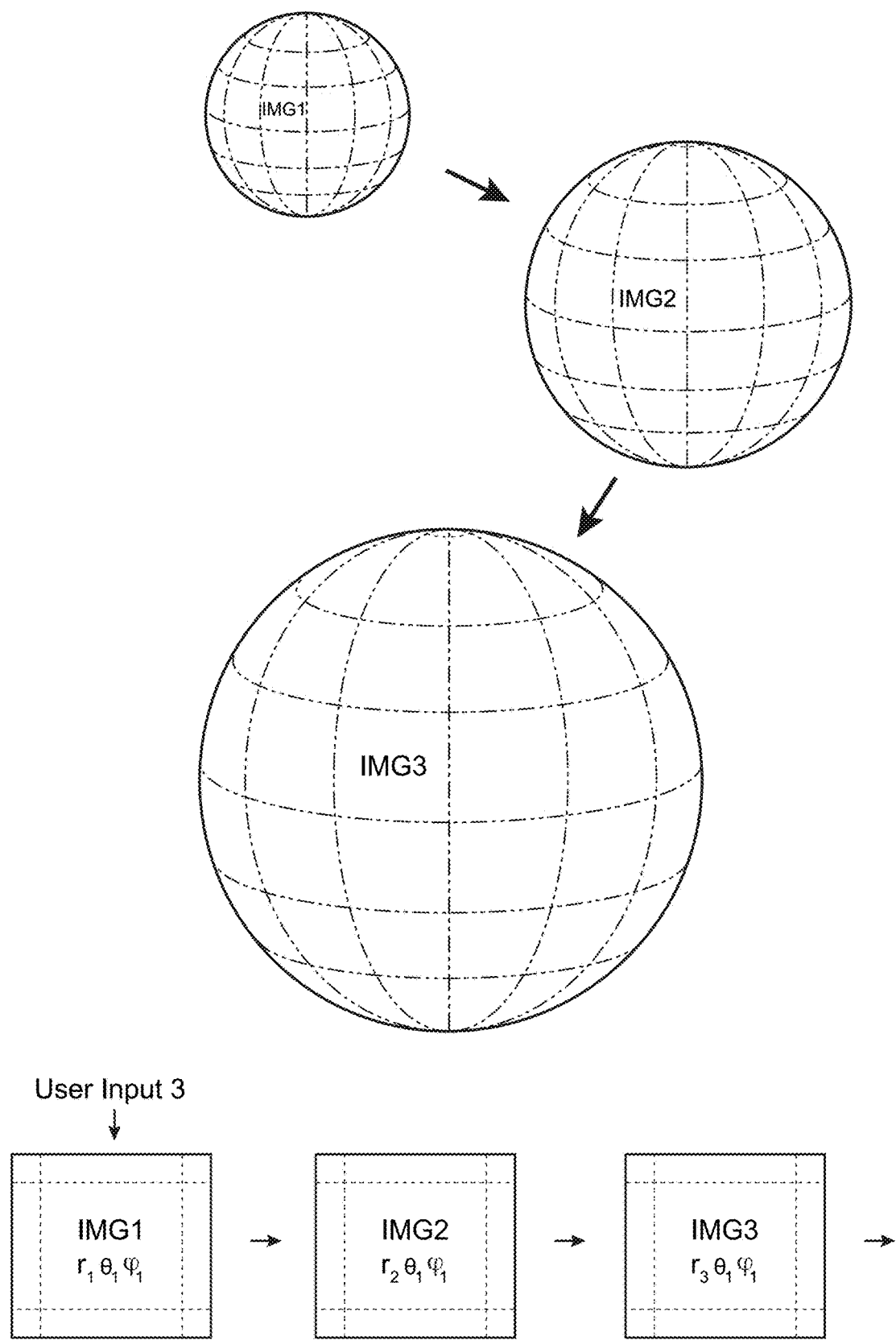
FIG. 10 illustrates the globe of FIG. 8 and zooming thereof based on a third user input.

FIG. 10 illustrates the globe of FIG. 8 and zooming thereof based on a third user input. Such a user input, User Input 3, may comprise clicking a zoom in button or scrolling a mouse wheel to zoom in. By way of example, the globe housing IMG1 may be formed by all pictures around an object a corresponding zoom orbit. Upon zooming in, IMG1 may be replaced by IMG 2, which may be represented in polar coordinates as have radius r-2 larger than r-1. Similarly, upon further zooming, IMG2 may be replaced by IMG3, having radius r-3 larger than r-2. In this manner, the depictions of the subsequent globes may be larger and depicting zoomed in views of the object. Furthermore, zooming may proceed from IMG1 to IMG3 in a single input, with intermediate positions to smooth zooming to show a clean animation. Thus, the individual depictions are displayed in series to depict zooming from IMG1 to IMG 3 below the globe with corresponding polar coordinates. The dotted lines may further depict locations where neighboring photographs or combinations of photographs are joined side-by-side for seamless rendering of a model of the object.

Figure 11:
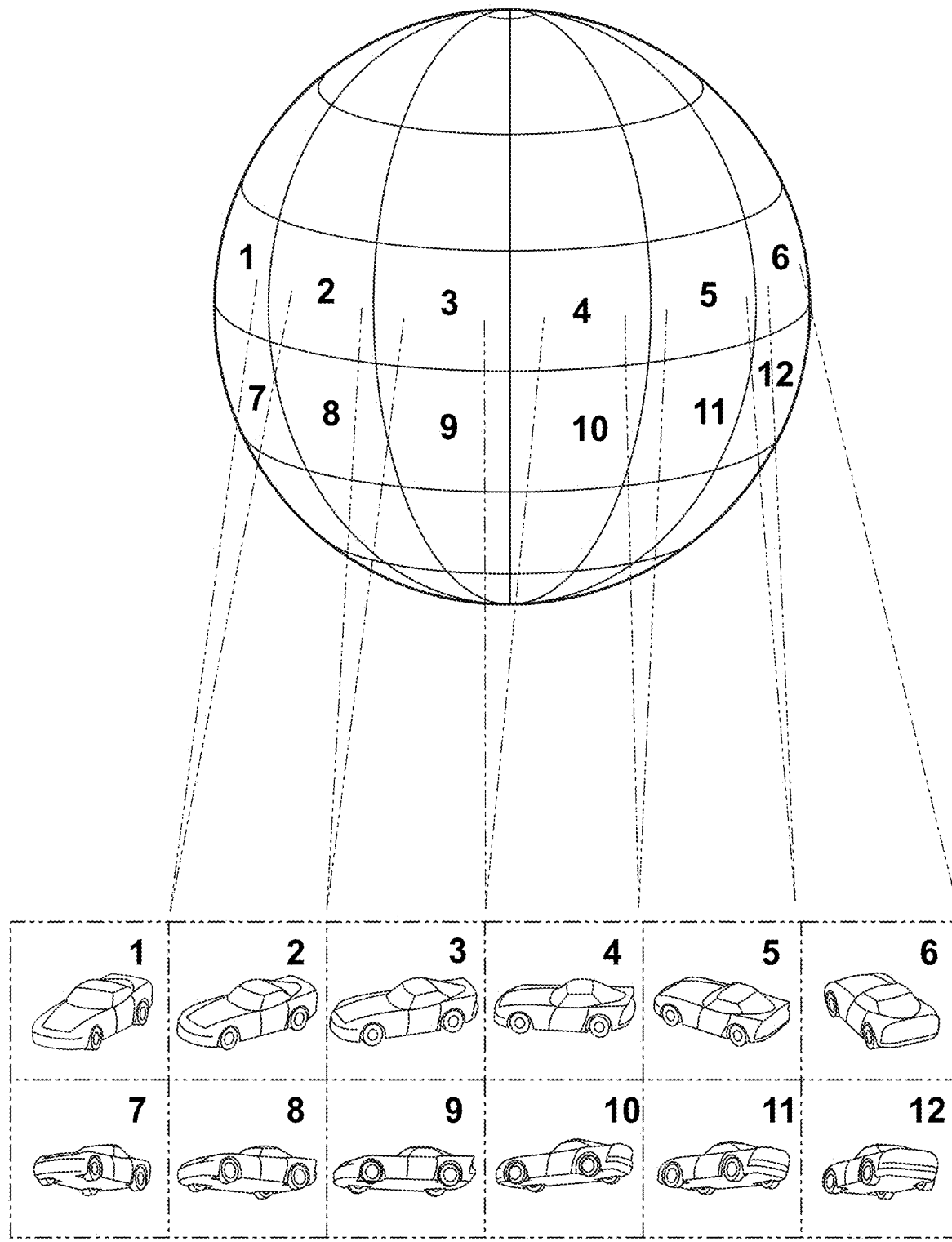
FIG. 11 illustrates the globe of FIG. 8 and discrete frames formed from photo stitching on the globe such that the object may be viewed at various angles.

FIG. 11 illustrates the globe of FIG. 8 and discrete frames formed from photo stitching on the globe such that the object may be viewed at various angles. By way of example, depictions 1-6 show rotation of the object from slightly above vertical center, such as would be viewed from a turntable. In FIG. 11 and the remaining figures, a car will be used as the example object. Depictions 7-12 show a similar rotation slightly below vertical center of the object. The depictions of the object around the globe are depicted from the viewport or point of view of the camera. When the object is photographed from all angles in a sphere, a corresponding globe may be represented for photo stitching and compilation of a model of the object.

Figure 12A:
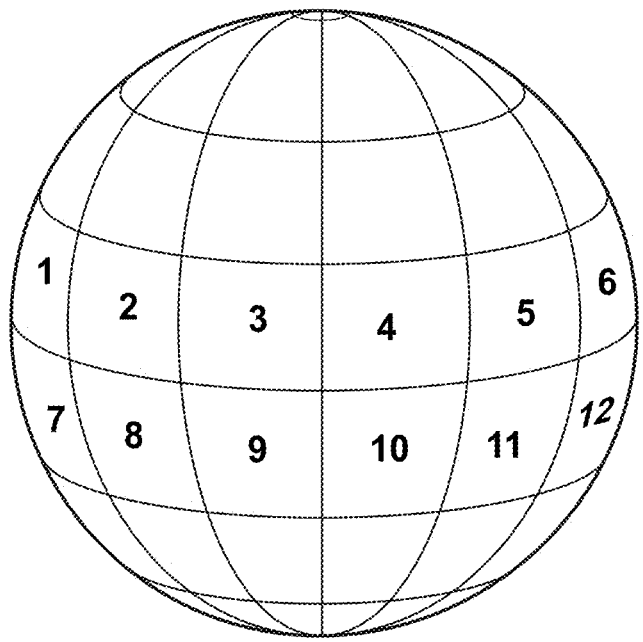
FIGS. 12a-12c illustrate a method of constructing the globe of FIG. 8 through photo stitching.
Figure 12B:
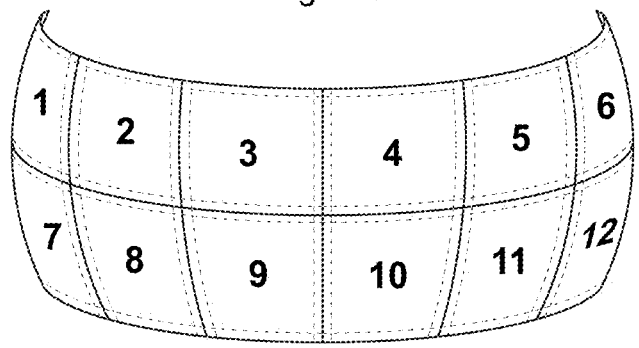
Figure 12C:
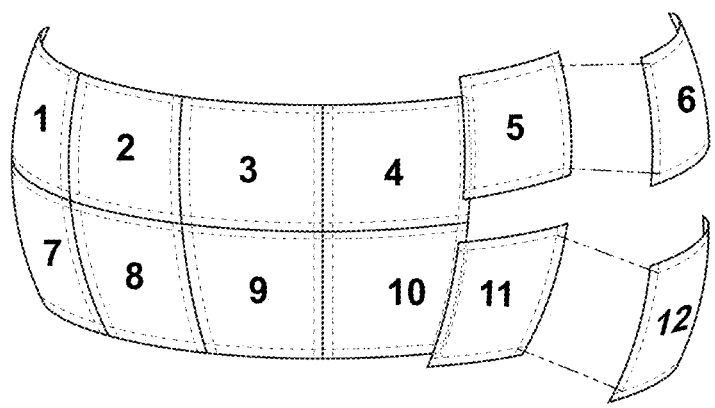

FIGS. 12a-12c illustrate a method of constructing the globe of FIG. 8 through photo stitching. FIG. 12a depicts the globe of FIG. 8, which represents the point of view of the camera when taking pictures of the object within the globe. FIG. 12b depicts the photographs from differing angles stitched together at the dotted lines. The dotted lines may not necessarily be straight but may follow the contours of the depiction of the object. When one or more pictures correspond, the resulting verified area may be used and stitched into the resulting depiction corresponding to the globe. FIG. 12c depicts a visual representation of the photograph or combination of photographs being compiled into the globe of photo stitched depictions from various angles.

Figure 13A:
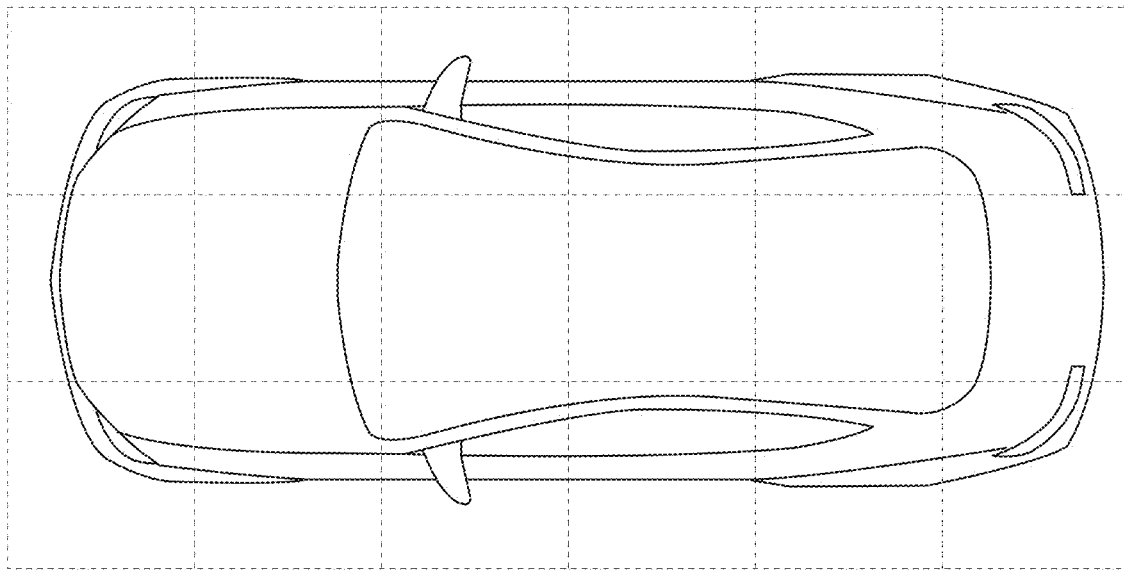
FIGS. 13a-13c illustrate portions of the object and formation of the corresponding view through photo stitching.
Figure 13B:
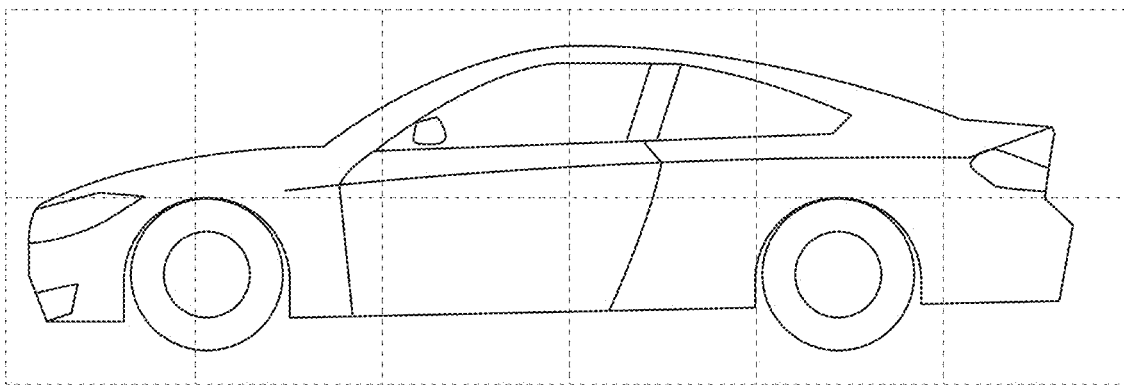
Figure 13C:
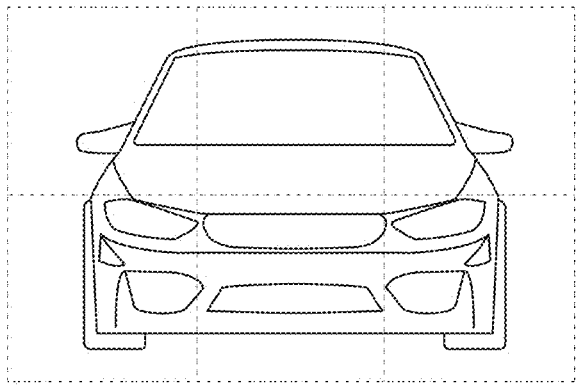

FIGS. 13a-13c illustrate portions of the object and formation of the corresponding view through photo stitching. FIG. 13a depicts a top of the photographed object as compiled through photo stitching. The individually depicted squares show a section taken from, e.g., a first photograph or a first combination of photographs, a second photograph or a second combination of photograph, etc. The dotted lines depict the locations of photo stitching between the corresponding photographs or corresponding combinations of photographs. These dotted lines may not necessarily be straight, as depicted. In some embodiments, these lines may follow contours of the depicted objection, although they could follow sections of the object. Similarly, FIG. 13b depicts a photo stitched side of the object. FIG. 13c depicts a front of the photo stitched object.

Figure 14A:
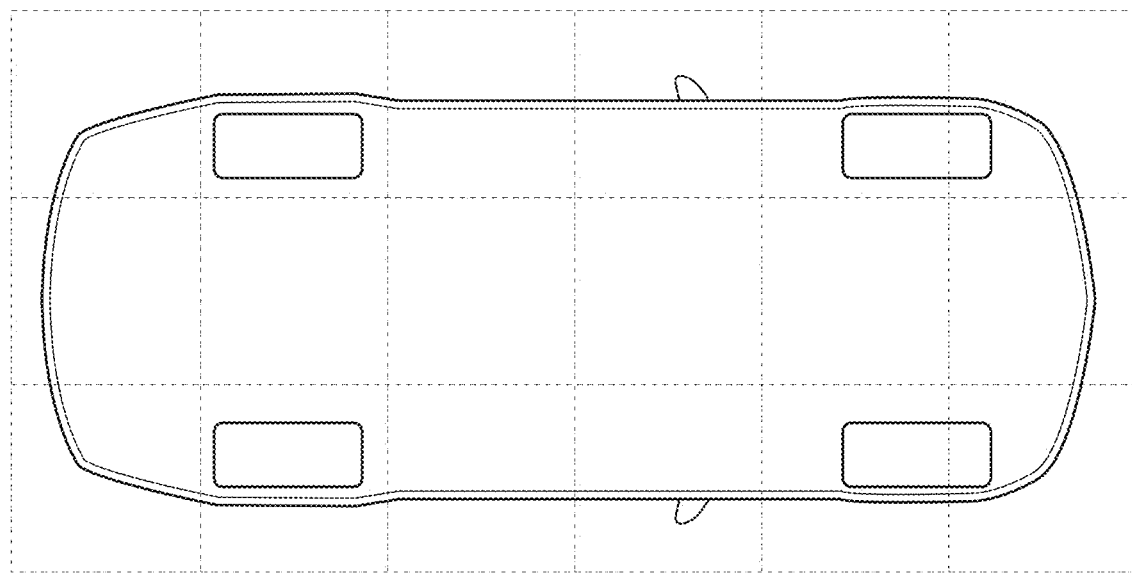
FIGS. 14a-14c illustration additional portions of the object and formation of the corresponding view through photo stitching.
Figure 14B:
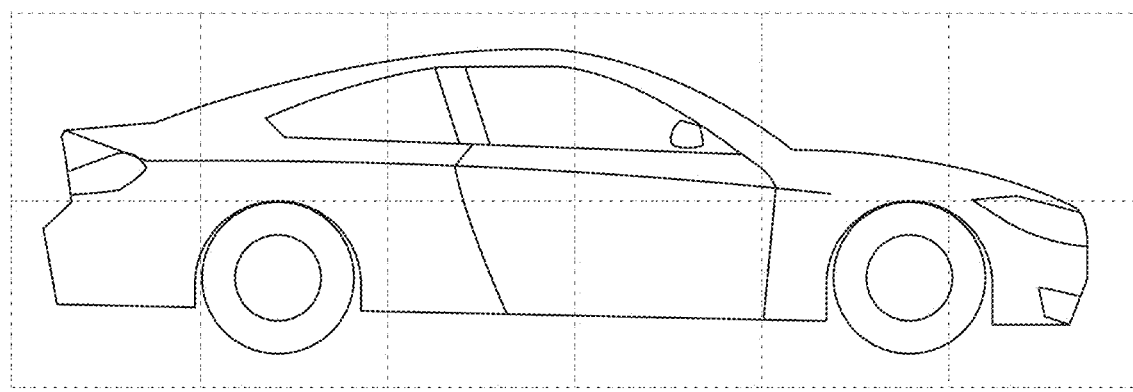
Figure 14C:
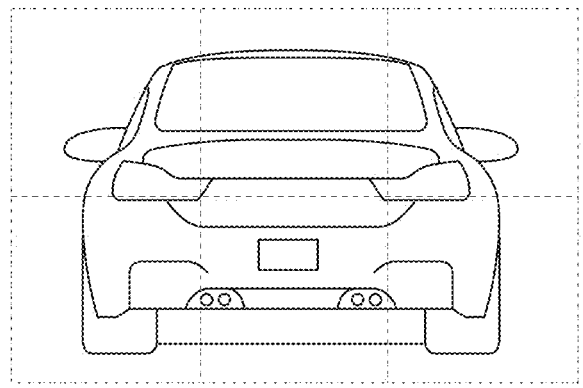

FIGS. 14a-14c illustration additional portions of the object and formation of the corresponding view through photo stitching. FIG. 14a depicts the bottom of the photographed object as compiled through photo stitching. The individually depicted squares show a section taken from, e.g., a first photograph or a first combination of photographs, a second photograph or a second combination of photograph, etc. The dotted lines depict the locations of photo stitching between the corresponding photographs or corresponding combinations of photographs. These dotted lines may not necessarily be straight, as depicted. In some embodiments, these lines may follow contours of the depicted objection, although they could follow sections of the object. Similarly, FIG. 14b depicts a photo stitched side of the object. FIG. 14c depicts a back of the photo stitched object.

Figure 15:
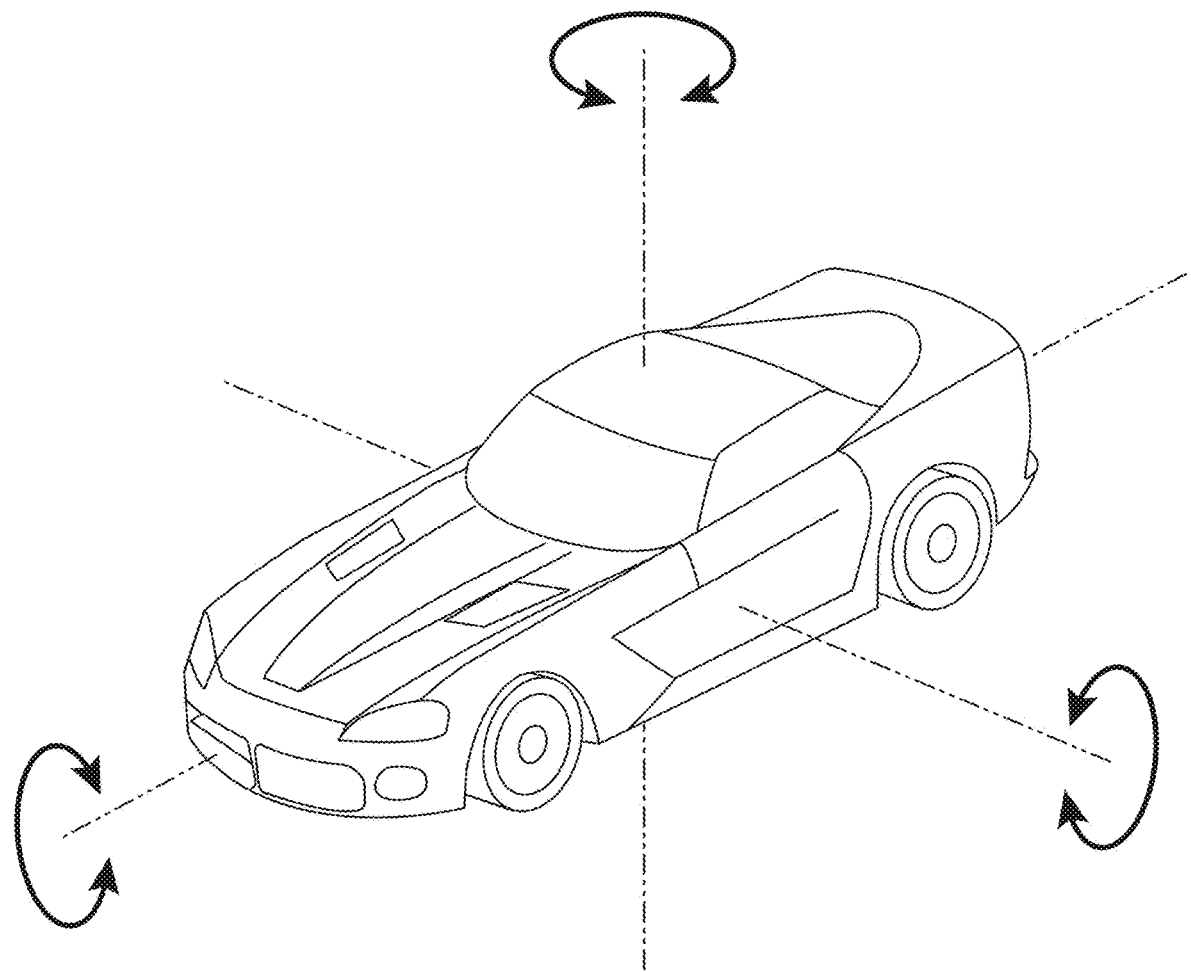
FIG. 15 illustrates a rotatable model formed by photo stitching individual photos into the globe of FIG. 8.

FIG. 15 illustrates a rotatable model formed by photo stitching individual photos into the globe of FIG. 8. In some embodiments, a 3d model may be stored in memory or on a disk such that the model is formed by photo stitching of various pictures from different angles. Similarities from different photos may be locked in when a surface is verified by two or more pictures. Furthermore, surface depth may be detected and store from the various pictures. The end result of photo stitching may comprise a 3d model that can be rotate about the X, Y, or Z axis and/or zoomed. Furthermore, individual parts, such as the bumper may become centered for zooming and rotation, upon user selection, rather than the center of the object.

Figure 16:
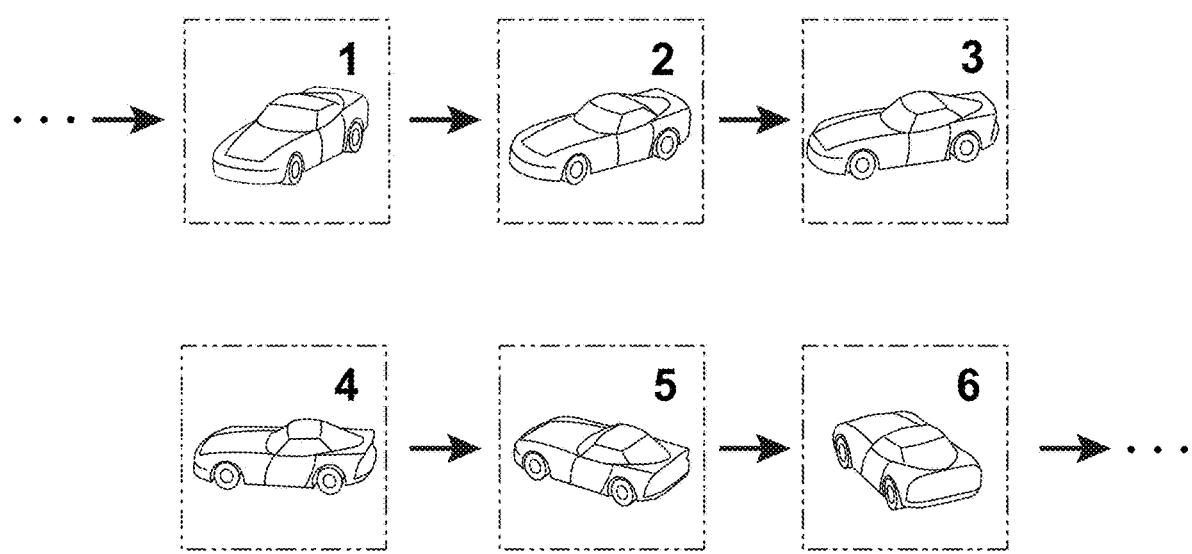
FIG. 16 illustrates a gallery view of a series of depictions of the object as may be viewed through a viewer when rotating the photo stitched model of FIG. 15 based on user input.

FIG. 16 illustrates a gallery view of a series of depictions of the object as may be viewed through a viewer when rotating the photo stitched model of FIG. 15 based on user input. In this illustrated series of depictions, the model is rotated horizontally to the right from the view of the user. This motion may be based on user input signaling horizontal rotation such as a right arrow key press or clicking a right arrow. Other motion is possible, such as left horizontal rotation. Vertical rotation and zooming may also be broken down into a series of smooth scrolling depiction when viewed from the viewer, such that the user may perceive a 3d model and may have a "tactile" experience in which the model is fully interactive. Exemplary viewers include a view within a webpage, an app, or any view of a computer or computing device.

Embodiments of the present invention may include methods of advertising and modeling a product, comprising taking a first picture of a product at a first position and at a first distance with a camera; taking a second picture of a product at the first distance and a second position with the camera; combining the pictures based on overlapping portions of the respective pictures; and providing an interactable model of the combined pictures. The camera is rotated about the product from the first position to the second position, and may be positioned such that overlap between the pictures is about 80% or greater. In some embodiments, the camera may be placed inside the lightbox and rotated about the product. The resulting pictures may be combined through processes of image registration, calibration, and blending. The resulting product model may be presented to a user from a server over the internet and through a view, such as a monitor. In this manner, the user may interact with the product model. For example, the product model may be rotated about a first axis based on a first user input, such as a click-and-drag event.

Further embodiments may include taking a first picture of a product at a third position and at a second distance; taking a second picture of a product at the second distance and a fourth position; combining the pictures based on overlapping portions of the respective pictures at the second distance; and providing an interactable model of the combined pictures at the second distance on the website. In this manner, the product model can be zoomed and/or the zoom level switched based on a second user input, such as a mouse wheel event.

In some embodiments, combining two photographs may include selecting an overlaid position of the two respective photographs in which a count of one or more similar overlapping pixels is maximized, retaining the one or more similar overlapping pixels in the combined product image, and appending one or more nonoverlapping pixels to a corresponding pixel position to generate the combined product image. For example, the maximization of similar overlapping pixels may be determined by one or more of color value, position, and time of flight. In further embodiments, key points may be maximized for positioning the overlap of two neighboring pictures for combining the pictures into the product model.

Embodiments of the present invention may include a system including a product within a lightbox, a camera within the lightbox, the camera configured to orbit about the product, a processor configured to combine two or more pictures taken by the camera. In some embodiments, an orbital pole configured to support the camera, the orbital pole configured to extend from a platform configured to support the product to the camera. The orbital pole may be moved by hand crank and/or by motor. Embodiments comprising a motor may be controlled by a processor under the direction of user input regarding speed and length of the orbital pole. The motor may be configured to drive rotation of the orbital pole about an axis of the platform. The processor may be further configured to combine two or more neighboring pictures taken from an orbit into a product model. For example, combining the two more neighboring pictures may be based one or more of color value, position, and time of flight. The product model may be generated and stored on disk or memory, such as that of the server. The server may also send the product model over the internet to a user device for viewing and interaction.

Unless specifically stated otherwise, it shall be understood that disclosure employing the terms "processing," "computing," "determining," "receiving," "transmitting," and others refer to a data processing system or other electronic device manipulating or transforming data within the device memories or controllers into other data within the system memories or registers.

One or more embodiments may be implemented in computer software firmware, hardware, digital electronic circuitry, and computer program products which may be one or more modules of computer instructions encoded on a computer readable medium for execution by or to control the operation of a data processing system. The computer readable medium may be a machine readable storage substrate, flash memory, hybrid types of memory, a memory device, a machine readable storage device, random access memory ("RAM"), read-only memory ("ROM"), a magnetic medium such as a hard-drive or floppy disk, an optical medium such as a CD-ROM or a DVR, or in combination for example. A computer readable medium may reside in or within a single computer program product such as a CD, a hard-drive, or computer system, or may reside within different computer program products within a system or network. The computer readable medium can store software programs that are executable by the processor and may include operating systems, applications, and related program code. The machine readable non-transitory medium storing executable program instructions which, when executed, will cause a data processing system to perform the methods described herein. When applicable, the ordering of the various steps described herein may be changed, combined into composite steps, or separated into sub-steps to provide the features described herein.

Computer programs such as a program, software, software application, code, or script may be written in any computer programming language including conventional technologies, object-oriented technologies, interpreted or compiled languages, and can be a module, component, or function. Computer programs may be executed in one or more processors or computer systems.

Although the invention has been discussed with reference to specific embodiments, it is apparent and should be understood that the concept can be otherwise embodied to achieve the advantages discussed. The preferred embodiments above have been described primarily as systems and methods for automatically generating photorealistic product models. In this regard, the foregoing description of the systems and methods is presented for purposes of illustration and description. It shall be understood that other combinations of computing device are contemplated in one or more embodiments.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method of modeling a product, comprising:
   taking a first picture of the product at a first position and at a first distance with a camera;
   taking a second picture of the product at the first distance and a second position with the camera, wherein the camera is rotated about the product from the first position to the second position;
   combining the first picture and the second picture based on overlapping portions of the respective pictures to form a combined product image, comprising:
     selecting an overlaid position of the first picture and the second picture in which a count of one or more similar overlapping pixels is maximized, wherein maximization of similar overlapping pixels is determined by color value, position, time of flight, radius, respective positions of the camera, and height, width, and depth of the product,
     wherein time of flight is measured from the camera to the surface of the product and height, width, and depth of the product is maintained by the overlaid position relative to the position of the camera,
     retaining the one or more similar overlapping pixels corresponding to the height, width, and depth of the product in the combined product image, and
     appending one or more nonoverlapping pixels to a corresponding pixel position corresponding to the height, width, and depth of the product to generate the combined product image; and
   taking an additional picture of the product at the first distance and at an additional position with the camera;
   combining the additional picture with the combined product image based on overlapping portions of the additional picture and the combined product image to further form the combined product image, comprising:
     selecting an overlaid position of the additional picture and the combined product image in which a count of one or more similar overlapping pixels is maximized, wherein maximization of similar overlapping pixels is determined by color value, position, time of flight, radius, respective positions of the camera, and the height, width, and depth of the product,
     wherein time of flight is measured from the camera to the surface of the product and height, width, and depth of the product is maintained by the overlaid position relative to the position of the camera,
     retaining the one or more similar overlapping pixels corresponding to the height, width, and depth of the product in the combined product image, and
     appending one or more nonoverlapping pixels to a corresponding pixel position corresponding to the height, width, and depth of the product in the combined product image; and
   providing an interactable model of the combined product image.

2. The method of claim 1, wherein the camera is placed inside a lightbox.

3. The method of claim 1, wherein combining the pictures further comprising:
   image registration, calibration, and blending.

4. The method of claim 1, wherein the first picture and the second picture overlap by about 90 percent or greater.

5. The method of claim 1, further comprising:
   receiving a first user input by a processor; and
   rotating, by a processor, the model about a first axis based on the first user input.

6. The method of claim 1, further comprising:
   taking a first picture of a product at a third position and at a second distance;
   taking a second picture of a product at the second distance and a fourth position;
   combining the pictures based on overlapping portions of the respective pictures at the second distance; and
   providing an interactable model of the combined pictures at the second distance on a website.

7. The method of claim 5, further comprising:
   receiving, by a processor, a second user input; and
   displaying, by a processor through a screen, a different zoom level model based on the second user input.

8. The method of claim 1, further comprising:
   repeating taking the additional picture and combining the additional picture with the combined product image until the interactable model corresponds to a 360-degree view of the product based on the combined product image.

9. The method of claim 1, further comprising:
   repeating taking the additional picture and combining the additional picture with the combined product image until the interactable model corresponds to a three-dimensional view of the product based on the combined product image.

10. A system, comprising:
    a product within a lightbox;
    a camera within the lightbox, the camera configured to orbit about the product;
    a processor configured to combine multiple pictures taken by the camera into a three-dimensional model of the product by
    receiving from the camera a first picture of the product at a first position and at a first distance with a camera;
    receiving from the camera a second picture of the product at the first distance and a second position with the camera, wherein the camera is rotated about the product from the first position to the second position;

combining the first picture and the second picture based on overlapping portions of the respective pictures to form a combined product image, comprising:

selecting an overlaid position of the first picture and the second picture in which a count of one or more similar overlapping pixels is maximized, wherein maximization of similar overlapping pixels is determined by color value, position, time of flight, radius, respective positions of the camera, and height, width, and depth of the product, wherein time of flight is measured from the camera to the surface of the product and height, width, and depth of the product is maintained by the overlaid position relative to the position of the camera, retaining the one or more similar overlapping pixels corresponding to the height, width, and depth of the product in the combined product image, and appending one or more nonoverlapping pixels to a corresponding pixel position corresponding to the height, width, and depth of the product to generate the combined product image; and providing an interactable model of the combined product image.

11. The system of claim 10, further comprising:
an orbital pole configured to support the camera, the orbital pole configured to extend from a platform configured to support the product to the camera; and
a motor configured to drive rotation of the orbital pole about an axis of the platform.

12. The system of claim 11, further comprising the processor configured to control rate of revolution of the orbital pole and the length of the orbital pole.

13. The system of claim 12, wherein the processor is configured to control the rate of revolution and length of the orbital pole based on a user input.

14. The system of claim 10, further comprising a processor configured to combine two or more neighboring pictures taken from an orbit into a product model.

15. The system of claim 14, further comprising:
a server configured to provide the product model to a user.

16. The system of claim 10, wherein the processor is further configured to combine multiple pictures taken by the camera into a three-dimensional model of the product by:

receiving an additional picture of the product at an additional at the first distance and at an additional position with the camera;

combining the additional picture and the combined product image based on overlapping portions of the additional picture and the combined product image to further form the combined product image, comprising:

selecting an overlaid position of the first picture and the second picture in which a count of one or more similar overlapping pixels is maximized, wherein maximization of similar overlapping pixels is determined by color value, position, time of flight, radius, respective positions of the camera, and the height, width, and depth of the product, wherein time of flight is measured from the camera to the surface of the product and height, width, and depth of the product is maintained by the overlaid position relative to the position of the camera, retaining the one or more similar overlapping pixels corresponding to the height, width, and depth of the product in the combined product image, and appending one or more nonoverlapping pixels from the additional picture to a corresponding pixel position corresponding to the height, width, and depth of the product in the combined product image.

17. The system of claim 16, wherein the processor is further configured to combine multiple pictures taken by the camera into a three-dimensional model of the product by:

repeating receiving the additional picture and combining the additional picture with the combined product image until the interactable model corresponds to a 360-degree view of the product based on the combined product image.

18. The system of claim 16, wherein the processor is further configured to repeat receiving the additional picture and combine the additional picture with the combined product image until the interactable model corresponds to a three-dimensional view of the product based on the combined product image.

* * * * *